(12) United States Patent
Tanihara et al.

(10) Patent No.: US 8,947,621 B2
(45) Date of Patent: Feb. 3, 2015

(54) LIQUID CRYSTAL DISPLAY DEVICE COMPRISING A FRONT PLATE HAVING A LAMDA/4 PLATE THAT INCLUDES A HARD COAT LAYER AND METHOD FOR MANUFACTURING THE SAME

(75) Inventors: Norie Tanihara, Kobe (JP); Takashi Murakami, Hachioji (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 179 days.

(21) Appl. No.: 13/823,960

(22) PCT Filed: Oct. 5, 2011

(86) PCT No.: PCT/JP2011/072948
§ 371 (c)(1),
(2), (4) Date: Mar. 15, 2013

(87) PCT Pub. No.: WO2012/050019
PCT Pub. Date: Apr. 19, 2012

(65) Prior Publication Data
US 2013/0169897 A1    Jul. 4, 2013

(30) Foreign Application Priority Data
Oct. 13, 2010    (JP) .................................. 2010-230318

(51) Int. Cl.
G02F 1/1335    (2006.01)
G02F 1/1333    (2006.01)
B29D 11/00    (2006.01)
G02F 1/13363    (2006.01)
G02F 1/13    (2006.01)

(52) U.S. Cl.
CPC ........ *B29D 11/0073* (2013.01); *G02F 1/13363* (2013.01); *G02F 1/1303* (2013.01); *G02F 2001/133331* (2013.01); *G02F 2001/133638* (2013.01)
USPC .......................................... 349/117; 349/122

(58) Field of Classification Search
USPC .................................................. 349/117–121
See application file for complete search history.

(56) References Cited

U.S. PATENT DOCUMENTS

2009/0147193 A1*   6/2009   Uchida et al. ................ 349/118
2009/0161044 A1*   6/2009   Ge et al. .......................... 349/98
2010/0134448 A1*   6/2010   Park et al. ..................... 345/176

FOREIGN PATENT DOCUMENTS

| JP | 08-201942 A | 8/1996 |
| JP | 2003-107433 A | 4/2003 |
| JP | 2004-157312 A | 6/2004 |
| JP | 2008-083307 A | 4/2008 |
| WO | WO2011/102493 A1 | 8/2011 |

* cited by examiner

*Primary Examiner* — Paul Lee
(74) *Attorney, Agent, or Firm* — Lucas & Mercanti, LLP

(57) ABSTRACT

Disclosed is a method for manufacturing a liquid crystal display device with a front plate including a step of providing, on a surface on a viewing side of a liquid crystal panel having polarizing plates on both sides, a λ/4 plate having a hard coat layer and composed of mainly a thermoplastic resin, an adhesive layer, a front plate composed of glass or acrylic, and a sealing layer containing a UV-curable tacky agent, all being stacked in this order from the viewing side; and a step of curing the sealing layer by irradiating with ultraviolet radiation from a hard coat layer side. The λ/4 plate having the hard coat layer contains 0.005 to 0.5 parts by mass of a compound which shows an absorption peak (λmax) in a wavelength range of 260 nm to 400 nm per 100 parts by mass of the thermoplastic resin composing the λ/4 plate.

14 Claims, 2 Drawing Sheets

LIQUID CRYSTAL DISPLAY DEVICE COMPRISING A FRONT PLATE HAVING A LAMDA/4 PLATE THAT INCLUDES A HARD COAT LAYER AND METHOD FOR MANUFACTURING THE SAME

CROSS REFERENCE TO RELATED APPLICATION

This Application is a 371 of PCT/JP2011/072948 filed on Oct. 5, 2011, which claimed the priority of Japanese Patent Application No. 2010-230318 filed on Oct. 13, 2010; both applications are incorporated herein by reference in its entirety.

TECHNICAL FIELD

The present invention relates to a method for manufacturing a liquid crystal display device with front plate, and a liquid crystal display device with front plate.

BACKGROUND ART

In recent years, there has been proposed a stereoscopic image display device such as television set capable of displaying stereoscopic images. One known system for displaying stereoscopic images allows the viewer, who wears dedicated glasses for viewing stereoscopic images, to recognize a two-dimensional image as a stereoscopic image. One promising system proposed at present is to allow the viewer, who wears glasses (G) for viewing stereoscopic images, to see images on a liquid crystal display device on which right-eye images and left-eye images, which are parallax images (disparity images), are alternately displayed in a time-series manner (for example, see Patent Literature 1).

In this sort of system making use of a liquid crystal shutter, both of systems using glasses with two polarizing plates and using glasses with a single polarizing plate need a $\lambda/4$ plate, in order to improve display performance obtainable when the viewer inclines the head. In particular, this is particularly important for the case where the glasses with a single polarizing plate are used.

The $\lambda/4$ plate is necessary also on the viewing side of the stereoscopic image display device, corresponding to the glasses for viewing stereoscopic images. Since the larger the stereoscopic image display device, the larger the effect of stereopsis, so that there is a strong demand for larger display device, and therefore there is a demand for large $\lambda/4$ plate suitable for large size display.

On the other hand, for further improvement in contrast of a liquid crystal display device, there has been discussed introduction of a front plate made of glass or acrylic resin on the viewing side of a conventional liquid crystal panel. By providing the front plate, diffused reflection due to irregularities on a surface of a conventional polarizing plate protective film may be reduced, and this ensures high-contrast and edgy expression of color.

The front plate, when bonded to the liquid crystal panel, may degrade the contrast when a void is formed in between, since the external light may cause multiple reflection on the interfaces. It is therefore preferable to provide a sealing layer for bringing the front plate and the liquid crystal panel into close contact while avoiding the void. Among various methods of curing the sealing layer such as heat curing, pressure-sensitive adhesion and so forth, the best choice is a method of UV curing using a UV-curable resin for the sealing layer.

For example, Patent Literature 2 discloses a technique of tightly bonding the liquid crystal panel and the front plate while placing a photo-curable resin in between, by irradiating it by light of 340 nm or longer wavelength, so as to eliminate wavelength components of shorter than 340 nm which may adversely affect the liquid crystal molecule, adhesive and so forth, thereby preventing the liquid crystal panel from being degraded and thus the quality of display is maintained.

The front plate made of glass or acrylic resin is not generally used alone, but is used typically in combination with a resin film having a hard coat layer for scratch prevention and antireflection. Accordingly, taking the productivity into account, a preferable method would be such that a sealing layer which has a UV-curable tacky agent, a front plate composed of glass or acrylic resin, an adhesive layer, and a resin film which has a hard coat layer are stacked in this order on the surface on the viewing side of the liquid crystal panel which has polarizing plates on both sides of the liquid crystal cell, and curing the sealing layer by irradiating it with UV light from the hard coat layer side.

When the front plate is attached to the stereoscopic image display device, it is preferable from the viewpoint of productivity to bond the $\lambda/4$ plate to the front plate. In this case, by using the $\lambda/4$ plate having a hard coat layer as the resin film, it becomes unnecessary to provide an additional hard coat film or $\lambda/4$ plate and successfully reduces the number of components of the stereoscopic image display device, which contributes to slimming of the display device.

Another problem, however, arose in the process of curing the sealing layer by UV irradiation from the hard coat layer side. That is, when irradiation dose of UV is increased aiming at delivering a necessary and sufficient amount of light for curing to the sealing layer, it induces heat load or UV load to the $\lambda/4$ plate having the hard coat layer and resulted in wrinkle or deformation between the hard coat layer and the $\lambda/4$ plate or peeling of the hard coat layer. In the stereoscopic image display device in need of precise parallax, even a slight wrinkle or deformation can result in lowered luminance and hue change, and crosstalk caused by the viewer's head inclination when viewing stereoscopic (3D) images.

CITATION LIST

Patent Literature

PATENT LITERATURE 1: Japanese Laid-Open Patent Publication No. H08-201942
PATENT LITERATURE 2: Japanese Laid-Open Patent Publication No. 2003-107433

SUMMARY OF THE INVENTION

Problem to be Solved by the Invention

It is therefore an object of the present invention to provide a method for manufacturing a liquid crystal display device with a front plate, which includes a step of bringing the front plate, bonded with the $\lambda/4$ plate having the hard coat layer, into close contact with the liquid crystal panel while placing in between the sealing layer having the UV-curable tacky agent, by which the sealing layer may be cured sufficiently by UV radiation, while avoiding wrinkle or deformation between the hard coat layer and the $\lambda/4$ plate, or peeling of the hard coat layer, and by which high contrast and good visibility may be ensured.

It is another object of the present invention to provide a liquid crystal display device for displaying stereoscopic image with a front plate, free from lowered luminance, hue change, and crosstalk caused by the viewer's head inclination when viewing stereoscopic (3D) images.

Means to Solve the Problem

The objects of the present invention will be attained by the configurations below.

[1] A method for manufacturing a liquid crystal display device with a front plate including a step of providing, on a surface on a viewing side of a liquid crystal panel having polarizing plates on both sides of the liquid crystal panel, a λ/4 plate having a hard coat layer and being composed of mainly a thermoplastic resin, an adhesive layer, a front plate composed of glass or acrylic, and a sealing layer containing a UV-curable tacky agent, all being stacked in this order from the viewing side; and a step of curing the sealing layer by irradiating with ultraviolet radiation from a hard coat layer side. The λ/4 plate having the hard coat layer contains 0.005 to 0.5 parts by mass of a compound which shows an absorption peak (λmax) in a wavelength range of 260 nm to 400 nm per 100 parts by mass of the thermoplastic resin composing the λ/4 plate.

[2] The method for manufacturing a liquid crystal display device with a front plate according to the configuration [1] in which the λ/4 plate shows a transmissivity of light at 380 nm of 30% or larger.

[3] The method for manufacturing a liquid crystal display device with a front plate according to the configurations [1] or [2] in which the compound which shows the absorption peak (λmax) in the wavelength range of 260 nm to 400 nm is a benzotriazole-based compound, benzophenone-based compound or triazine-based compound.

[4] The method for manufacturing a liquid crystal display device with a front plate according to any one of the configurations [1] to [3] in which the λ/4 plate contains 90% by mass or more of the compound which shows the absorption peak (λmax) in the wavelength range of 260 nm to 400 nm, relative to a total content of the compound, within a 50% range in a thickness direction of the λ/4 plate from an interface with the hard coat layer.

[5] The method for manufacturing a liquid crystal display device with a front plate according to any one of the configurations [1] to [4] in which the λ/4 plate is a stack of two or more layers formed by co-casting having a film layer of 0.5 to 10 μm thick on the hard coat layer side, and the film layer on the hard coat layer side contains 90% by mass or more of the compound which shows the absorption peak (λmax) in the wavelength range of 260 nm to 400 nm relative to the total content of the compound in the λ/4 plate.

[6] The method for manufacturing a liquid crystal display device with a front plate according to any one of the configurations [1] to [5] in which the thermoplastic resin which mainly composes the λ/4 plate is cellulose acylate or alicyclic polyolefin resin.

[7] A liquid crystal display device with a front plate manufactured by the method for manufacturing a liquid crystal display device with a front plate described in any one of the configurations [1] to [6].

[8] The liquid crystal display device with a front plate according to the configuration [7] in which the device is designed for a stereoscopic image display device.

Advantageous Effects of Invention

According to the present invention, there is provided a method for manufacturing a liquid crystal display device with a front plate, the device being configured such that the front plate which is bonded with a λ/4 plate having a hard coat layer is brought into close contact with a liquid crystal panel by placing in between a sealing layer having a UV-curable tacky agent. The method is capable of sufficiently curing the sealing layer by UV radiation while avoiding wrinkle or deformation between the hard coat layer and the λ/4 plate or peeling of the hard coat layer, and thereby ensuring high contrast and good visibility.

According to the present invention, there is also provided a liquid crystal display device for a stereoscopic image display with a front plate that is free from lowered luminance, hue change, and crosstalk even when stereoscopic (3D) images were observed with a viewer's head being inclined.

DESCRIPTION OF EMBODIMENTS

Embodiments of the present invention will be detailed below, without limiting the present invention.

The method for manufacturing a liquid crystal display device with a front plate includes: providing, on the surface on the viewing side of the liquid crystal panel having polarizing plates on both sides thereof, a λ/4 plate mainly composed of a thermoplastic resin and having a hard coat layer, an adhesive layer, a front plate composed of glass or acrylic, and a sealing layer containing a UV-curable tacky agent, stacked in this order as viewed from the viewing side; and curing the sealing layer by irradiating it with ultraviolet radiation from the hard coat layer side. The λ/4 plate, which has the hard coat layer, contains 0.005 to 0.5 parts by mass of a compound which shows an absorption peak (λmax) in a wavelength range of 260 nm to 400 nm, per 100 parts by mass of the thermoplastic resin composing the λ/4 plate.

Figure 1:
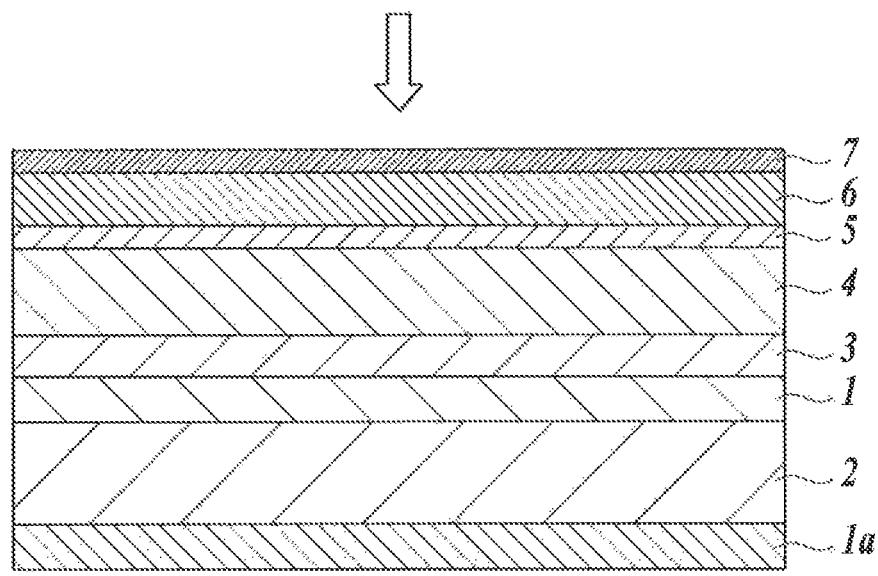
FIG. 1 is a schematic drawing illustrating a method for manufacturing a liquid crystal display device with a front plate of the present invention.

FIG. 1 is a schematic drawing illustrating the method for manufacturing a liquid crystal display device with a front plate, according to the present invention. FIG. 1 illustrates a minimum configuration of the method for manufacturing a liquid crystal display device with a front plate, without limiting the present invention.

On the surface, on the viewing side, of the liquid crystal panel which is composed of a liquid crystal cell 2 and polarizing plates 1, 1a holding it in between, a λ/4 plate 6 having a hard coat layer, an adhesive layer 5, a front plate 4 composed of glass or acrylic, a sealing layer 3 containing a UV-curable tacky agent are provided in this order as viewed from the viewing side, and then the sealing layer 3 is cured by irradiating it with UV radiation from the hard coat layer side, to thereby bring the liquid crystal panel and the front plate into close contact.

The present inventors made a prototype λ/4 plate containing no UV absorber and provided with a hard coat layer so as not to interfere UV-assisted curing of the sealing layer having an UV-curable tacky agent, and manufactured a liquid crystal display device with a front plate by curing the sealing layer under UV irradiation. However, practical problems such as wrinkle or deformation between the hard coat layer of the λ/4 plate and the base film and peeling of the hard coat layer were observed even under irradiation dose of UV not causative of any problems in curing of the sealing layer.

The present inventors found out a striking fact from diligent investigations for the problem that the wrinkle or deformation between the hard coat layer and the λ/4 plate and peeling of the hard coat layer may be suppressed to a considerable degree by adding 0.005 to 0.5 parts by mass of a compound which shows an absorption peak (λmax) in a wavelength range of 260 nm to 400 nm to the λ/4 plate, per 100 parts by mass of the thermoplastic resin composing the λ/4 plate. The finding led the inventors to complete the present invention.

The λ/4 plate of the present invention preferably has a transmissivity of light at 380 nm of 30% or larger. This configuration is successful to achieve both of curing of the sealing layer, and provision of the λ/4 plate with a hard coat free from wrinkle or deformation between the hard coat layer and the λ/4 plate and peeling of the hard coat layer.

The compound which shows an absorption peak (λmax) in a wavelength range of 260 nm to 400 nm used for the present invention is preferably a benzotriazole-based compound, benzophenone-based compound or triazine-based compound.

Although an exact mechanism remains unclear, it is supposed that, by adding the compound to the λ/4 plate while adjusting the amount of which within a specific range, the compound appropriately absorbs UV ray which is irradiated onto the sealing layer and generates heat, and the generated heat propagates so as to enhance adherence between the surface of the λ/4 plate and the resin composing the hard coat layer.

Content of the compound less than 0.005 parts by mass may result in wrinkle or deformation between the hard coat layer and the base film and peeling of the hard coat layer. On the other hand, the content of the compound exceeding 0.5 parts by mass may result in an excessive amount of heat generation, which increases deformation between the hard coat layer and the λ/4 plate or degrades the adherence due to bleeding.

The compound is not necessarily contained in the λ/4 plate uniformly over the entire portion. It is more preferable from the viewpoint of enhancing the adherence that 90% by mass or more, relative to the total content, of the compound is contained in the λ/4 plate within a 50% range in the thickness-wise direction of the λ/4 plate from the interface with the hard coat layer. It is more preferable that the λ/4 plate is a stack of two or more layers formed by co-casting, which has a film layer on the hard coat layer side of 0.5 to 10 μm thick, and the film layer contains 90% by mass or more of the compound relative to the total content in the λ/4 plate.

Configuration of the present invention will now be detailed in the order of reference numerals 1 to 7 in FIG. 1. Note that an arrow in FIG. 1 indicates irradiation of UV ray.

<Liquid Crystal Panel>

The liquid crystal panel used for the present invention has polarizing plates 1, 1a provided on both surfaces of a liquid crystal cell 2. The polarizing plates may be the same or different from each other.

(Liquid Crystal Cell)

The liquid crystal cell 2 may be any LCD of reflection type, transmission type, and semi-transmission type. LCDs based on various driving systems, including TN type, STN type, OCB type, HAN type, VA type (PVA type, MVA type) and IPS type, may preferably be used.

(Polarizing Plate)

Each of the polarizing plates 1, 1a used for the present invention employs, as a polarizer, a stretched product of polyvinyl alcohol doped with iodine or a dichroic dye, in which at least one surface of the polarizer is supported by a polarizing plate protective film. The polarizer is 5 to 40 μm thick, preferably 5 to 30 μm thick, and particularly 5 to 20 μm thick.

Although not specifically limited, the polarizing plate protective film is preferably a polymer film, and is preferably simple in the manufacturing, optically uniform, and optically transparent. The film may be anything so long as it has these features, and is selectable for example from cellulose acylate-based film, polyester-based film, polycarbonate-based film, polyarylate-based film, polysulfone (including polyethersulfone)-based film, polyester film such as polyethylene terephthalate and polyethylene naphthalate, polyethylene film, polypropylene film, cellophane, cellulose diacetate film, cellulose acetate butyrate film, polyvinylidene chloride film, polyvinyl alcohol film, ethylenevinyl alcohol film, syndiotactic polystyrene-based film, polycarbonate film, norbornene resin-based film, polymethylpentene film, polyether ketone film, polyether ketone imide film, polyamide film, fluorine-containing resin film, nylon film, cycloolefin polymer film, polyvinyl acetal-based resin film, polymethyl methacrylate film or acrylic film, but not limited thereto. These films used herein are preferably manufactured by solution casting or melt casting. Among these films, cellulose acylate film, polycarbonate film, polysulfone (including polyether sulfone), and cycloolefin polymer film are preferable. From the viewpoints of manufacturing, cost, transparency, uniformity and adherence, cellulose acylate film and cycloolefin polymer film are particularly preferable for the present invention. Commercially available cellulose acylate film preferably used herein include Konica Minolta TAC KC8UX, KC4UX, KC5UX, KC8UCR3, KC8UCR4, KC8UCR5, KC8UY, KC4UY, KC12UR, KC16UR, KC4UE, KC8UE, KC4FR-1, KC4FR-2 (all from Konica Minolta Opto, Inc.).

The polarizing plate may be manufactured by any of general methods. Alkali-saponified protective films are preferably bonded to both surfaces of the polarizer, using an aqueous solution of fully-saponified polyvinyl alcohol.

(Stereoscopic Image Display Panel)

The liquid crystal panel of the present invention may be used to configure a stereoscopic image display device.

For example, the stereoscopic image display device may be configured by the liquid crystal panel and liquid crystal shutter glasses, in which the liquid crystal shutter glasses may be configured by (1) a protective film, a liquid crystal cell, and a polarizer provided in this order, or by (2) a protective film, a polarizer, a liquid crystal cell, and a polarizer provided in this order.

On the liquid crystal panel, right-eye images and left-eye images, which are disparity images of an object to be observed, are alternately displayed, and are recognized in a stereoscopic manner through the liquid crystal shutter glasses.

<Sealing Layer>

The sealing layer 3 of the present invention includes a UV-curable tacky agent, and cures under UV irradiation to tightly bond the liquid crystal panel and the front plate.

The UV-curable tacky agent available herein includes those composed of UV-curable component and a photo-polymerization initiator, and is optionally added with general additive(s) such as a crosslinking agent, tackiness imparting agent, filler, anti-aging agent, and colorant.

The UV-curable component is arbitrarily selectable from monomer, dimer, oligomer and polymer having in the molecule thereof carbon-carbon double bond, and is curable by radical polymerization. They are exemplified by esters formed by (meth)acrylate and polyhydric alcohol, such as trimethylolpropane tri(meth)acrylate, pentaerythritol tri(meth)acrylate, tetraethylene glycol di(meth)acrylate, 1,6-hexanediol (meth)acrylate, neopentyl glycol di(meth)acrylate, and dipentaerythritol hexa(meth)acrylate; and isocyanurate or isocyanurate compound such as ester acrylate oligomer, 2-propenyl-di-3-butenyl cyanurate, 2-hydroxyethyl bis(2-acryloxyethyl) isocyanurate, tris(2-methacryloxyethyl) isocyanurate, and tris(2-methacryloxyethyl) isocyanurate. Note that there is no need of specially adding the UV-curable component, if a UV-curable polymer having a carbon-carbon double bond in the side chain thereof is used as an acrylic polymer.

Of commercially available UV-curable components, one suitable choice is "SVR", a photoelastic resin from Sony Chemical and Information Device Corporation, mainly composed of a UV-curable acrylic-based resin.

The present invention is, however, not limited to specific UV-curable components, and may use any substances curable by UV radiation for simplicity of manufacturing, without departing from technical spirit of the present invention.

The photo-polymerization initiator will suffice if it can cleave to produce a radical, upon being irradiated by UV ray at an arbitrary wavelength which can initiate the polymerization reaction. Preferable examples include benzoin alkyl ethers such as benzoin methyl ether, benzoin isopropyl ether, and benzoin isobutyl ether; aromatic ketones such as benzil, benzoyl, benzophenone, and α-hydroxycyclohexyl phenyl ketone; aromatic ketals such as benzyl dimethyl ketal; polyvinyl benzophenone; and thioxanthones such as chlorothioxanthone, dodecyl thioxanthone, dimethyl thioxanthone, and diethyl thioxanthone. The crosslinking agent includes, for example, polyisocyanate compound, melamine resin, urea resin, polyamine, and carboxy group-containing polymer.

Available forms of the tacky agent include solvent type, emulsion type and hotmelt type, and those of the solvent type and emulsion type are generally used. Alternatively, other auxiliaries may be added and mixed, to thereby prepare a coating liquid. Examples of the other auxiliaries include viscosity reducer, thickener, pH control agent, defoaming agent, preservative/fungicide, pigment, inorganic filler, stabilizer, wetting agent, and humectant.

The sealing layer may be formed by using a publicly-known method such as a gravure coater, dip coater, reverse coater, wire bar coater, die coater or ink-jet process, thereby a coating composition for forming the sealing layer is coated, then dried under heating, and cured by UV irradiation.

Dry thickness of the sealing layer is 0.1 to 50 μm on the average basis, preferably 1 to 40 μm and particularly 10 to 30 μm.

Light source for UV curing is arbitrarily selectable without special limitation so long as it can generate ultraviolet radiation. Examples of the light source include low-pressure mercury lamp, medium-pressure mercury lamp, high-pressure mercury lamp, ultrahigh-pressure mercury lamp, carbon arc lamp, metal halide lamp, and xenon lamp.

While conditions of irradiation may vary depending on the individual lamps, UV irradiation dose is generally 1000 to 6000 mJ/cm$^2$ in terms of integral dose and preferably 2000 to 5000 mJ/cm$^2$.

<Front Plate>

The front plate 4 is necessarily transparent, smooth and large in physical strength, and is configured by glass plate or acrylic resin plate.

<Adhesive Layer>

The adhesive layer 5 of the present invention is a layer containing a tacky agent (including adhesive) for bonding the front plate and the λ/4 plate having the hard coat layer of the present invention.

While the tacky agent is selectable from various types of pressure-sensitive adhesive such as rubber-based tacky agent, acrylic tacky agent and silicone-based tacky agent and generally used is an acrylic tacky agent that is colorless, clear and good in adherence with the liquid crystal cell. The acrylic tacky agent preferably has a weight average molecular weight of a base polymer of 300,000 to 2,500,000 or around.

Monomer which is used for acrylic polymer composing the base polymer of the acrylic tacky agent is selectable from various types of alkyl (meth)acrylate [alkyl (meth)acrylate herein means alkyl acrylate and/or alkyl methacrylate, the same will apply hereinafter as for (meth)]. Specific examples of alkyl (meth)acrylate include methyl (meth)acrylate, ethyl (meth)acrylate, butyl (meth)acrylate, and 2-ethylhexyl (meth)acrylate. They may be used independently or in combination among them. In order to impart polarity to the thus-obtainable acrylic polymer, also (meth)acrylic acid, glycidyl (meth)acrylate, 2-hydroxyethyl (meth)acrylate, N-methylol (meth)acylamide or the like may be used in place of a part of alkyl (meth)acrylate. It is further possible to optionally use in combination therewith other co-polymerizable monomer, such as vinyl acetate, styrene or the like, without impairing the tacky performance of the acrylic polymer.

The acrylic polymer may be manufactured by any of various publicly-known methods, which is arbitrarily selectable from radical polymerization methods such as bulk polymerization, solution polymerization and suspension polymerization. Radical polymerization initiator is arbitrarily selectable from publicly known azo-based products, peroxide-based products and so forth. Among the methods of manufacturing, the solution polymerization is preferable. Solvent for the acrylic polymer is generally a polar solvent such as ethyl acetate, toluene or the like.

The base polymer of the rubber-based tacky agent is exemplified by natural rubber, isoprene-based rubber, styrene-butadiene-based rubber, reclaimed rubber, polyisobutylene-based rubber, and also by styrene-isoprene-styrene-based rubber, and styrene-butadiene-styrene-based rubber. The base polymer of the silicone-based tacky agent is exemplified by dimethylpolysiloxane, and diphenylpolysiloxane.

The tacky agent preferably contains a crosslinking agent. The crosslinking agent is exemplified by polyisocyanate compound, polyamine compound, melamine resin, urea resin, epoxy resin, and metal chelate. The tacky agent may, if necessary, be applied with a tackiness imparting agent, plasticizer, filler, antioxidant, UV absorber, silane coupling agent or the like in an appropriate manner without departing from the object of the present invention.

The thinner the tacky agent layer (dry film), the better from the viewpoint of retardation of the tacky agent per se, and dimensional stability, and more specifically the thickness is preferably 5 to 30 μm or around.

<λ/4 Plate>

The λ/4 plate of the present invention refers to a member capable of converting linearly polarized light at a certain specific wavelength into circular polarized light (or, converting circular polarized light into linearly polarized light). The λ/4 plate is designed to provide an in-plane phase difference value Ro of approximately ¼, at a specific wavelength (generally in the visible light region).

The λ/4 plate of the present invention has an in-plane phase difference Ro(590), measured at 590 nm, in the range from 110 to 170 nm.

The λ/4 plate for the present invention is preferably a phase difference plate (resin film) having a retardation of approximately ¼ of wavelength in the wavelength range of visible light, from the viewpoint of obtaining almost complete circular polarized light in the wavelength range of visible light.

"Retardation of approximately ¼ in the wavelength range of visible light" preferably satisfies that the retardation is larger at longer wavelength in the range from 400 to 700 nm, and that phase difference value Ro(450) measured at 450 nm and phase difference value Ro(590) measured at 590 nm, both represented by the formula (i) below, satisfy 1<Ro(590)/Ro(450)≤1.6. For more effective function, the λ/4 plate is preferably a phase difference film having Ro(450) in the range from 100 to 125 nm, phase difference value Ro (550) measured at 550 nm in the range from 125 to 142 nm, and Ro (590) in the range from 130 to 152 nm.

$$Ro = (nx - ny) \times d \qquad \text{Formula (i):}$$

$$Rt = \{(nx + ny)/2 - nz\} \times d \qquad \text{Formula (ii):}$$

In the formulae, nx represents maximum in-plane refractive index of the layer (also referred to as refractive index in the direction of phase retardation axis), and ny represents in-plane refractive index in the direction orthogonal to the phase retardation axis, measured at 23° C. and 55% RH at 450 nm, 550 nm and 590 nm, respectively, and d represents a thickness (nm) of the film.

The Ro and Rt may be measured using an automatic birefringence analyzer. An automatic birefringence analyzer KOBRA-21ADH (from Oji Scientific Instruments) is used for a measurement of the birefringence under the circumstance at 23° C. and 55% RH at the individual wavelengths, and thereby the Ro is determined.

A circular polarizing plate can be obtained by stacking the λ/4 plate and the polarizer so as to align the phase retardation axis of the former substantially 45° away from the transmission axis of the latter. The "substantially 45°" means the range from 40° to 50°. Angle between the in-plane phase retardation axis of the λ/4 plate and the transmission axis of the polarizer is preferably 41° to 49°, more preferably 42° to 48°, further preferably 43° to 47°, and most preferably 44° to 46°.

The λ/4 plate used for the present invention is a film containing a thermoplastic resin. The thermoplastic resin used herein is exemplified by cellulose acylate resin, polyester resin, polycarbonate resin, polyarylate resin, polysulfone resin, polyethylene terephthalate resin, polypropylene resin, alicyclic polyolefin resin, polyamide resin, fluorine-containing resin, nylon, polyvinyl acetal-based resin, and acrylic, without being limited thereto. Among them, cellulose acylate resin and alicyclic polyolefin resin are preferable from the viewpoints of manufacturing, cost, easiness in processing, transparency, uniformity and adherence.

A cellulose acylate film using a cellulose acylate resin and alicyclic polyolefin resin film using alicyclic polyolefin resin will be explained below as the λ/4 plate of the present invention.

<Cellulose Acylate Film>

The cellulose acylate film used as the λ/4 plate of the present invention preferably contains cellulose acylate designed for use for optical film.

The cellulose acylate preferably has a $C_2$ or longer aliphatic acyl group, and more preferably has a total degree of acyl substitution of cellulose acylate of 1.0 to 2.95, and a total number of carbon atoms of acyl groups of 2.0 to 9.5.

The total number of carbon atoms of acyl groups in the cellulose acylate is preferably 4.0 to 9.0, and more preferably 5.0 to 8.5. Note that the total number of carbon atoms of acyl groups is a sum of products of the degree of substitution of the individual acyl groups substituted on the glucose unit of the cellulose acylate group and the number of carbon atoms.

The number of carbon atoms of the aliphatic acyl group is preferably 2 or larger and 6 or smaller, from the viewpoint of productivity of cellulose synthesis and cost, and more preferably 2 or larger and 4 or smaller. Portions not substituted by the acyl groups generally remain in the form of hydroxy groups.

Each of the glucose units, which form cellulose through β-1,4-glycoside bonds, has free hydroxy groups at the 2-, 3- and 6-positions. The cellulose acylate of the present invention is a polymer obtained by esterifying a part of, or all of the hydroxy groups with acyl groups. The degree of acyl group substitution means the sum of degrees of esterification of cellulose at the 2-, 3-, and 6-positions of the repeating units. More specifically, when the hydroxy groups at each of the 2-, 3- and 6-positions of cellulose are esterified by 100%, then the degree of substitution is 1. Accordingly, when all of the 2-, 3- and 6-positions of cellulose are esterified by 100%, then the degree of substitution maximizes at 3.

The acyl group is exemplified by acetyl group, propionyl group, butyryl group, pentanate group and hexanate group, and the cellulose acylate is exemplified by cellulose acetate, cellulose propionate, cellulose butyrate, and cellulose pentanate. If the above-described number of carbon atoms in the side chains is satisfied, mixed fatty acid esters such as cellulose acetate, cellulose acetate propionate, cellulose propionate, cellulose acetate butyrate, cellulose acetate pentanate may be used. Among them, cellulose acetates such as cellulose triacetate and diacetyl cellulose are particularly preferable for use for optical film.

Preferable cellulose acylate other than cellulose triacetate preferably has $C_{2-4}$ acyl groups as substituents, and preferably satisfies both of the inequalities (I) and (II) at the same time, assuming the degree of acetyl group substitution as X, and the degree of propionyl group or butyryl group substitution as Y.

$$1.5 \leq X + Y \leq 2.95 \qquad \text{Inequality (I)}$$

$$1.5 \leq X \leq 2.95 \qquad \text{Inequality (II)}$$

In the present invention, cellulose acetate propionate is preferably used, and those satisfying 1.5≤X≤2.5, and 0.1≤Y≤1.45 are preferably used. Portions not substituted by the acyl groups generally remain in the form of hydroxy groups. The degree of acyl group substitution may be measured in accordance with ASTM-D817-96.

The cellulose acylate of the present invention preferably has a weight average molecular weight Mw of 50,000 to 500,000, more preferably 100,000 to 300,000, and furthermore preferably 150,000 to 250,000.

The average molecular weight and molecular weight distribution of the cellulose acylate may be measured by high performance liquid chromatography. By using the technique, the weight average molecular weight (Mw) and the molecular weight distribution are calculated.

Conditions of measurement are as follow.
Solvent: methylene chloride
Column: Shodex K806, K805, K803G (all from Showa Denko K.K., used by connecting three columns in series)
Column temperature: 25° C.
Sample concentration: 0.1% by mass
Detector: RI Model 504 (from GL Science Inc.)
Pump: L6000 (from Hitachi Ltd.)
Flow rate: 1.0 ml/min Calibration curve: standard polystyrene STK (from Tosoh Corporation)

A calibration curve based on 13 samples ranging from Mw=1,000,000 to 500 was used. These 13 samples are preferably used at approximately regular intervals.

Source cellulose of the cellulose acrylate used for the present invention may be either wood pulp or cotton linter, where the wood pulp may be either soft wood or hard wood. Soft wood pulp is preferably used. The cellulose acylate produced from these materials may be used in an arbitrarily mixed manner or independently.

For example, ratio of the cotton linter-derived cellulose acylate:wood pulp (soft wood)-derived cellulose acylate:wood pulp (hard wood)-derived cellulose acylate may be 100:0:0, 90:10:0, 85:15:0, 50:50:0, 20:80:0, 10:90:0, 0:100:0, 0:0:100, 80:10:10, 85:0:15, or 40:30:30.

Cellulose having a large degree of polymerization is preferred for the present invention, and a linter pulp for example is preferable. The cellulose used herein is preferably composed of at least linter pulp. Content of α-cellulose, which serves as an index of degree of crystallinity of cellulose, is 90% or larger (for example, 92 to 100%, preferably 95 to 100%, and more preferably 99.5 to 100% or around).

The cellulose acylate of the present invention may be manufactured by any of publicly known methods. In general, the source cellulose, a predetermined organic acid (acetic acid, propionic acid, etc.), an acid anhydride (acetic anhydride, propionic anhydride, etc.) and a catalyst (sulfuric acid, etc.) are mixed to thereby esterify the cellulose, wherein the reaction is allowed to proceed until triester of the cellulose is formed. In the resultant triester, three hydroxy groups in the glucose unit are substituted by the acyl groups of the organic acid. When two species of organic acids are concomitantly used, a mixed ester-type cellulose acylate, such as cellulose acetate propionate and cellulose acetate butyrate, may be prepared. The triester of cellulose is then hydrolyzed to thereby synthesize the cellulose acylate having a desired degree of acyl substitution. The cellulose acylate is completed after the individual processes of filtration, precipitation, washing with water, dewatering, and drying.

More specifically, the triester of cellulose may be synthesized according to the description in Japanese Laid-Open Patent Publication No. H10-45804.

<Alicyclic Polyolefin Resin Film>

The alicyclic polyolefin resin composing the alicyclic polyolefin resin film used as the λ/4 plate of the present invention is an amorphous resin having alicyclic structure(s) in the principal chain and/or side chain. The alicyclic structure in the alicyclic polyolefin resin is exemplified by saturated alicyclic hydrocarbon (cycloalkane) structure, and unsaturated alicyclic hydrocarbon (cycloalkene) structure. From the viewpoints of mechanical strength, heat resistance and so forth, cycloalkane structure is preferable. While the number of carbon atoms composing the alicyclic structure is not specifically limited, characteristics regarding mechanical strength, heat resistance, and formability of film are successfully balanced when the number of carbon atom is 4 to 30 in general, preferably 5 to 20 and more preferably 5 to 15.

A ratio of repeating unit having the alicyclic structure which composes the alicyclic polyolefin resin is preferably 55% by mass or more, more preferably 70% by mass or more, and particularly 90% by mass or more. The ratio of the repeating unit having the alicyclic structure, which compose the alicyclic polyolefin resin, fallen in these ranges is preferable from the viewpoints of transparency and heat resistance.

The alicyclic polyolefin resin is exemplified by norbornene-based resin, monocyclic olefin-based resin, cyclic conjugated diene-based resin, vinyl alicyclic hydrocarbon-based resin, and hydrogenated products of these resins. Among them, norbornene-based resin is preferably used by virtue of its good transparency and formability.

The norbornene-based resin is exemplified by ring-opening polymer composed of monomers having a norbornene structure or ring-opening copolymer composed of the norbornene structure-containing monomer and other monomer, or hydrides of them; and addition polymer composed of monomers having a norbornene structure or addition copolymer composed of the norbornene structure-containing monomer and other monomer, or hydrides of them. Among them, the ring-opening (co)polymer hydrides composed of the norbornene structure-containing monomer(s) are used in a particularly preferable manner, from the viewpoints of transparency, formability, heat resistance, low hygroscopicity, dimensional stability, and light weight.

The monomer having a norbornene structure is exemplified by bicyclo[2.2.1]hepto-2-ene (common name: norbornene), tricyclo[4.3.0.12,5]deca-3,7-diene (common name: dicyclopentadien), 7,8-benzotricyclo[4.3.0.12,5]deca-3-ene (common name: metanotetrahydrofluorene), tetracyclo[4.4.0.12,5.17,10]dodeca-3-ene (common name: tetracyclododecene), and derivatives of these compounds (for example, those having substituent (s) on the ring). The substituent is exemplified by alkyl group, alkylene group, and polar group. A plurality of these substituents, all of which may be same or different, may be bound to the ring. The monomer having the norbornene structure may be used independently, or two or more species of which may be combined.

The polar group is exemplified by heteroatom, or atomic group having a heteroatom. The heteroatom is exemplified by oxygen atom, nitrogen atom, sulfur atom, silicon atom, and halogen atom. Specific examples of the polar group include carboxy group, carbonyloxycarbonyl group, epoxy group, hydroxy group, oxy group, ester group, silanol group, silyl group, amino group, nitrile group, and sulfone group. In view of obtaining the film with a small saturated water absorption, smaller content of the polar group is preferable, and absence of the polar group is more preferable.

Examples of other monomer capable of proceeding ring-opening copolymerization with the norbornene structure-containing monomer include monocyclic olefins such as cyclohexene, cycloheptene, and cyclooctene, and the derivatives of them; and cyclic conjugated dienes such as cyclohexadiene, and cycloheptadiene, and the derivatives thereof.

The ring-opening polymer of norbornene structure-containing monomer and the ring-opening copolymer of the norbornene structure-containing monomer and other monomer copolymerizable therewith may be obtained by (co)polymerization of the monomers under the presence of a publicly-known ring-opening polymerization catalyst.

Examples of the other monomer capable of proceeding addition copolymerization with the norbornene structure-containing monomer include $C_{2-20}$ α-olefins such as ethylene, propylene and 1-butene and derivatives thereof; cycloolefins such as cyclobutene, cyclopentene and cyclohexene and derivatives thereof; and non-conjugated dienes such as 1,4-hexadiene, 4-methyl-1,4-hexadiene and 5-methyl-1,4-hexadiene. These monomers may be used independently, or two or more species of which may be combined. Among them, α-olefins are preferable and ethylene is more preferable.

The addition polymer of the norbornene structure-containing monomer and the addition copolymer of the norbornene structure-containing monomer and the other monomer copolymerizable therewith may be obtained by polymerization of the monomers under the presence of a publicly-known addition polymerization catalyst.

The hydride of the ring-opening polymer of the norbornene structure-containing monomer, the hydride of the ring-opening copolymer of the norbornene structure-containing monomer and the other monomer capable of proceeding ring-opening copolymerization therewith, the hydride of the addition polymer of the norbornene structure-containing monomer, and the hydride of the addition copolymer of the norbornene structure-containing monomer and the other monomer capable of proceeding addition copolymerization therewith are obtainable by adding, to solution of these ring-opening (co)polymer or addition (co)polymer, a publicly-known hydrogenation catalyst containing a transition metal such as nickel, palladium or the like, and by bringing the solution into contact with hydrogen, to thereby hydrogenate the carbon-carbon unsaturated bonds preferably to an extent of 90% or more.

Among the norbornene-based resins, preferable is any of those having, as the repeating units, a bicyclo[3.3.0]octane-2,4-diyl-ethylene structure (X) and a tricyclo[4.3.012,5]decane-7,9-diyl-ethylene structure (Y), the content of these repeating units is 90% by mass or more of the entire repeating units of the norbornene-based resin, and ratio by mass of the content of X and the content of Y (X:Y) is 100:0 to 40:60. By using this sort of resin, the optical film not causative of dimensional changes over a long term and excellent in stability of the optical characteristics may be obtained.

Molecular weight of the alicyclic polyolefin resin preferably used for the present invention is appropriately selectable depending on the purpose of use, and weight average molecular weight (Mw) of polyisoprene which is dissolved in cyclohexane as a solvent (or toluene for insoluble resin) and measured by gel permeation chromatography (polystyrene equivalent when toluene was used as the solvent) is generally 15,000 to 50,000, preferably 18,000 to 45,000, and more preferably 20,000 to 40,000. When the weight average molecular weight falls in the ranges, the film is excellently balanced between the mechanical strength and formability.

The molecular weight distribution (weight average molecular weight (Mw)/number average molecular weight (Mn)) of the alicyclic polyolefin resin preferably used for the present invention is generally 1.0 to 10.0, preferably 1.1 to 4.0, and more preferably 1.2 to 3.5, but not specifically limited thereto.

Glass transition temperature of the alicyclic polyolefin resin used for the present invention is appropriately selectable depending on purpose of use, and is preferably 80° C. or above, and more preferably in the range from 100 to 250° C. The film having the glass transition temperature within the above-described ranges is excellent in durability, without causing deformation or stress under high temperatures.

<Compound Showing Absorption Peak (λmax) in Wavelength Range from 260 nm to 400 nm>

The λ/4 plate of the present invention, having the hard coat layer and mainly composed of a thermoplastic resin, characteristically contains 0.005 to 0.5 parts by mass, per 100 parts by mass of the thermoplastic resin, of a compound which shows an absorption peak (λmax) in the wavelength range from 260 nm to 400 nm (referred to as "adhesion modifier", hereinafter).

Content of the adhesion modifier is preferably not affective to irradiation dose of UV to the sealing layer, and is capable of preventing the wrinkle or deformation between the hard coat layer and the λ/4 plate, and peeling of the hard coat layer. The content is preferably 0.005 to 0.1 parts by mass.

The λ/4 plate preferably shows a transmissivity of light at 380 nm of 30% or larger, more preferably 50% or larger, and particularly 70% or larger.

Whether the adhesion modifier is a compound which shows an absorption peak (λmax) in the wavelength range from 260 nm to 400 nm or not may be measured by dissolving the compound into an appropriate solvent (for example, dichloromethane, toluene or the like) and using a spectrophotometer by general procedures. For example, measurement may be conducted using a spectrophotometer UVIDFC-610 from Shimadzu Corporation, and any of self-recording spectrophotometers Model 330, Model U-3210, Model U-3410 and Model U-4000 from Hitachi Ltd.

The adhesion modifier of the present invention is exemplified by oxybenzophenone-based compound, benzotriazole-based compound, salicylate ester-based compound, benzophenone-based compound, cyanoacrylate-based compound, nickel complex salt-based compound and triazine-based compound, and preferable examples are less-coloring benzotriazole-based compound, benzophenone-based compound and triazine-based compound.

The adhesion modifier is preferably any of those excellent in UV absorbance at 370 nm or shorter, and small in absorbance of visible light of 400 nm or longer.

In the present invention, the sealing layer is irradiated by UV ray for curing as described later. Accordingly, the adhesion modifier being excellent in the adhesion modification effect in accordance with the UV irradiation dose is preferably selected from anyone of those showing an absorption maximum in the wavelength range from 260 nm to 355 nm.

(Benzotriazole-Based Compound)

The benzotriazole-based compound for the present invention is preferably a compound represented by the general formula (A) below.

[Chemical Formula 1]

General Formula (A)

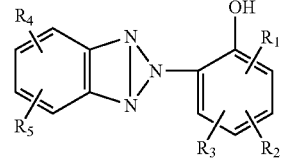

In the formula, R1, R2, R3, R4 and R5 may be the same or different, each of which independently represents a hydrogen atom, halogen atom, nitro group, hydroxyl group, alkyl group, alkenyl group, aryl group, alkoxy group, acyloxy group, aryloxy group, alkylthio group, arylthio group, mono- or dialkylamino group, acylamino group or 5- to 6-membered heterocyclic group, where R4 and R5 may combine to form a 5- to 6-membered carbon ring.

These groups described in the above may have arbitrary substituents.

Specific examples of the compound represented by the general formula (A) will be listed below, but not limited thereto.

The benzotriazole-based compound useful for the present invention is exemplified by, but not limited to, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2,2-methylenebis(4-(1,1,3,3- tetramethylbutyl)-6-(2H-benzo triazole-2-yl)phenol), 2-(2'-hydroxy-3'-tert-butyl-5'-methylphenyl)-5-chlorobenzotriazole, 2-(2H-benzotriazole-2-yl)-6-(straight-chain and side-chain dodecyl)-4-methylphenol, and mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate. Commercially available examples preferably used include TINUVIN 109, TINUVIN 171, TINUVIN 326, and TINUVIN 928 (all from BASF Japan Ltd.).

(Benzophenone-Based Compound)

The benzophenone-based compound for the present invention is preferably a compound represented by the general formula (B) below.

[Chemical Formula 2]

General Formula (B)

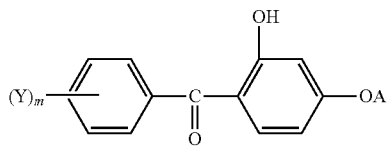

In the formula, Y represents a hydrogen atom, halogen atom or alkyl group, alkenyl group, alkoxy group, or phenyl group, where the alkyl group, alkenyl group and phenyl group may have substituent(s). "A" represents a hydrogen atom, alkyl group, alkenyl group, phenyl group, cycloalkyl group, alkyl carbonyl group, alkyl sulfonyl group or —CO(NH)$_n$-1-D group, where D represents an alkyl group, alkenyl group or phenyl group which may have substituent(s). Each of m and n represents 1 or 2.

The alkyl group described in the above typically represents a straight-chain or branched aliphatic group having up to 24 carbon atoms, the alkoxy group typically represents an alkoxy group having up to 18 carbon atoms, and the alkenyl group represents an alkenyl group having up to 16 carbon atoms such as allyl group, 2-butenyl group and so forth. Possible substituents on the alkyl group, alkenyl group and phenyl group include chlorine, bromine and fluorine atoms, hydroxy group and phenyl group (which may be substituted by alkyl group or halogen atom).

Specific examples of the benzophenone-based compound represented by the general formula (B) will be listed below, but not limited thereto.

The examples include 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

CHIMASSORB 81 (from BASF Japan Ltd.) is a commercially available product which may preferably be used.

Also an UV absorber described in Japanese Laid-Open Patent Publication No. H06-148430 is preferably used.

(Triazine-Based Compound)

Compounds having at least two aromatic rings may be used as the triazine-based compound.

In this specification, "aromatic ring" includes not only aromatic hydrocarbon ring, but also aromatic heterocycle.

The aromatic hydrocarbon ring is particularly preferably a six-membered ring (or, benzene ring).

The aromatic heterocycle is generally an unsaturated heterocycle. The aromatic heterocycle is preferably a five-membered ring, six-membered ring or seven-membered ring, and more preferably a five-membered ring or six-membered ring.

The aromatic heterocycle generally has a possible maximum number of double bonds. The heteroatom is preferably a nitrogen atom, oxygen atom and sulfur atom, and particularly a nitrogen atom. Examples of the aromatic heterocycle include furan ring, thiophene ring, pyrrole ring, oxazole ring, isooxazole ring, triazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

The aromatic ring is preferably a benzene ring, condensed benzene ring, and biphenyls. In particular, 1,3,5-triazine ring is preferably used. More specifically, compounds typically disclosed in Japanese Laid-Open Patent Publication No. 2001-166144 are preferably used.

The aromatic ring preferably has 2 to 20 carbon atoms, more preferably 2 to 12 carbon atoms, furthermore preferably 2 to 8 carbon atoms, and most preferably 2 to 6 carbon atoms.

Modes of bonding of two aromatic rings are classified into (a) formation of a condensed ring, (b) direct bonding through a single bond, and (c) bonding through a coupling group (aromatic rings cannot form a spiro bond). The mode of bonding may be any of (a) to (c).

Examples of (a) condensed ring (condensed ring formed by two or more aromatic rings) include indene ring, naphthalene ring, azulene ring, fluorene ring, phenanthrene ring, anthracene ring, acenaphthylene ring, biphenylene ring, naphthalene ring, pyrene ring, indole ring, isoindole ring, benzofuran ring, benzothiophene ring, indolizine ring, benzooxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, pheoxazine ring and thianthrene ring. Naphthalene ring, azulene ring, indole ring, benzooxazole ring, benzothiazole ring, benzoimidazole ring, benzotriazole ring and quinoline ring are preferable.

The single bond (b) is preferably a bond between carbon atoms of two aromatic rings. Two or more single bonds may combine two aromatic rings, to thereby form an aliphatic ring or non-aromatic heterocycle between the two aromatic rings.

Also the coupling group (c) preferably combines carbon atoms of two aromatic rings. The coupling group is preferably an alkylene group, alkenylene group, alkynylene group, —CO—, —O—, —NH—, —S— or arbitrary combination of them. Examples of the coupling group based on combination will be listed below. Note that the examples of coupling groups shown below may be flipped horizontally.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- Each of the aromatic ring and the coupling group may have a substituent.

Examples of the substituent include halogen atom (F, Cl, Br, I), hydroxyl group, carboxyl group, cyano group, amino group, nitro group, sulfo group, carbamoyl group, sulfamoyl group, ureido group, alkyl group, alkenyl group, alkynyl group, aliphatic acyl group, aliphatic acyloxy group, alkoxy group, alkoxycarbonyl group, alkoxycarbonylamino group, alkylthio group, alkylsulfonyl group, aliphatic amide group, aliphatic sulfonamide group, aliphatic substituted amino group, aliphatic substituted carbamoyl group, aliphatic substituted sulfamoyl group, aliphatic substituted ureido group and non-aromatic heterocyclic group.

The alkyl group preferably has 1 to 8 carbon atoms. Open-chain alkyl group is more preferable than cyclic alkyl group, and straight chain alkyl group is particularly preferable. The alkyl group may additionally have a substituent (for example, hydroxy group, carboxy group, alkoxy group and alkyl substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group and 2-diethylaminoethyl group.

The alkenyl group preferably has 2 to 8 carbon atoms. Open-chain alkenyl group is more preferable than cyclic alkenyl group, and straight chain alkenyl group is particularly preferable. The alkenyl group may additionally have a substituent. Examples of the alkenyl group include vinyl group, allyl group and 1-hexenyl group.

The alkynyl group preferably has 2 to 8 carbon atoms. Open-chain alkynyl group is more preferable than cyclic alkynyl group, and straight chain alkynyl group is particularly preferable. The alkynyl group may additionally have a substituent. Examples of the alkynyl group include ethynyl group, 1-butynyl group and 1-hexynyl group.

The aliphatic acyl group preferably has 1 to 10 carbon atoms. Examples of the aliphatic acyl group include acetyl group, propanoyl group and butanoyl group.

The aliphatic acyloxy group preferably has 1 to 10 carbon atoms. Examples of the aliphatic acyloxy group include acetoxy group.

The alkoxy group preferably has 1 to 8 carbon atoms. The alkoxy group may additionally have a substituent (for example, alkoxy group). Examples of the alkoxy group (including substituted alkoxy group) include methoxy group, ethoxy group, butoxy group and methoxyethoxy group.

The alkoxy carbonyl group preferably has 2 to 10 carbon atoms. Examples of the alkoxy carbonyl group include methoxycarbonyl group and ethoxycarbonyl group.

The alkoxycarbonylamino group preferably has 2 to 10 carbon atoms. Examples of the alkoxycarbonylamino group include methoxycarbonylamino group and ethoxycarbonylamino group.

The alkylthio group preferably has 1 to 12 carbon atoms. Examples of the alkylthio group include methylthio group, ethylthio group and octylthio group.

The alkylsulfonyl group preferably has 1 to 8 carbon atoms. Examples of the alkylsulfonyl group include methanesulfonyl group and ethanesulfonyl group.

The aliphatic amide group preferably has 1 to 10 carbon atoms. Examples of the aliphatic amide group include acetamide.

The aliphatic sulfonamide group preferably has 1 to 8 carbon atoms. Examples of the aliphatic sulfonamide group include methanesulfonamide group, butanesulfonamide group and n-octanesulfonamide group.

The aliphatic substituted amino group preferably has 1 to 10 carbon atoms. Examples of the aliphatic substituted amino group include dimethylamino group, diethyl amino group and 2-carboxyethyl amino group.

The aliphatic substituted carbamoyl group preferably has 2 to 10 carbon atoms. Examples of the aliphatic substituted carbamoyl group include methylcarbamoyl group and diethylcarbamoyl group.

The aliphatic substituted sulfamoyl group preferably has 1 to 8 carbon atoms. Examples of the aliphatic substituted sulfamoyl group include methylsulfamoyl group and diethyl sulfamoyl group.

The aliphatic substituted ureido group preferably has 2 to 10 carbon atoms. Examples of the aliphatic substituted ureido group include methylureido group.

Examples of the non-aromatic heterocyclic group include piperidino group and morpholino group.

The triazine-based compound preferably has a molecular weight of 300 to 800.

Triazine compound represented by the general formula (I) below is preferably used as the triazine-based compound.

[Chemical Formula 3]

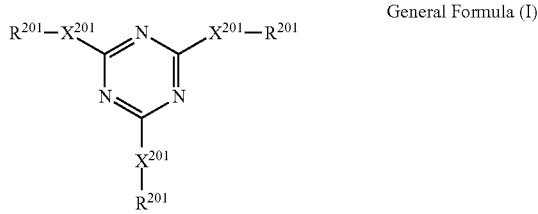

General Formula (I)

In the formula (I):
each R201 independently represents an aromatic ring or heterocycle having substituent (s) at least at any of the ortho, meta and para positions.

Each X201 independently represents a single bond or —NR202-. Each R202 independently represents a hydrogen atom, substituted or unsubstituted alkyl group, alkenyl group, aryl group or heterocyclic group.

The aromatic ring represented by R201 is preferably a phenyl or naphthyl ring and particularly a phenyl ring. The aromatic ring represented by R201 may have at least one substituent at any substitutive position. Examples of the substituent include halogen atom, hydroxyl group, cyano group, nitro group, carboxyl group, alkyl group, alkenyl group, aryl group, alkoxy group, alkenyloxy group, aryloxy group, acyloxy group, alkoxy carbonyl group, alkenyloxycarbonyl group, aryloxycarbonyl group, sulfamoyl group, alkyl substituted sulfamoyl group, alkenyl substituted sulfamoyl group, aryl substituted sulfamoyl group, sulfonamide group, carbamoyl group, alkyl substituted carbamoyl group, alkenyl substituted carbamoyl group, aryl substituted carbamoyl group, amide group, alkyl thio group, alkenylthio group, arylthio group and acyl group.

The heterocyclic group represented by R201 preferably has aromaticity. The heterocycle having aromaticity is generally unsaturated heterocycle, and is preferably a heterocycle having a possible maximum number of double bonds. The heterocycle is preferably a five-membered ring, six-membered ring or seven-membered ring, more preferably a five-membered ring or six-membered ring, and most preferably six-membered ring. Heteroatom in the heterocycle is preferably a nitrogen atom, sulfur atom or oxygen atom, and particularly a nitrogen atom. Pyridine ring (2-pyridyl group or 4-pyridyl group as a heterocyclic group) is particularly preferable as the heterocycle having aromaticity. The heterocyclic group may have a substituent. Examples of the substituent of the heterocyclic group are the same as those on the aryl portion described in the above.

The heterocyclic group for the case where X201 represents a single bond is preferably a heterocyclic group having a free valency on a nitrogen atom. The heterocyclic group having a free valency on a nitrogen atom is preferably a five-membered ring, six-membered ring or seven-membered ring, more preferably a five-membered ring or six-membered ring, and most preferably a five-membered ring. The heterocyclic group may have a plurality of nitrogen atoms. The heterocyclic group may have a heteroatom other than nitrogen atom (for example, O, S). Examples of the heterocyclic group having free valency on nitrogen atom(s) are shown below. In the formulae, —$C_4H_9$ (n) represents n-$C_4H_9$.

[Chemical Formula 4]

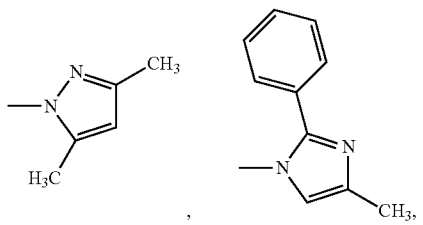

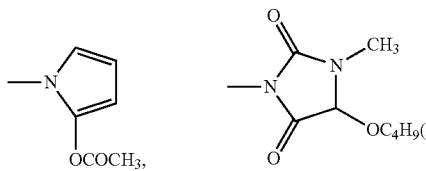

The alkyl group represented by R202 may be a cyclic alkyl group or open-chain alkyl group. The open-chain alkyl group is preferable, and straight chain alkyl group is more preferable than branched chain alkyl group. The alkyl group preferably has 1 to 30 carbon atoms, more preferably 1 to 20, more preferably 1 to 10, more preferably 1 to 8, and most preferably 1 to 6. The alkyl group may have a substituent. Examples of the substituent include halogen atom, alkoxy group (for example, methoxy group and ethoxy group) and acyloxy group (for example, acryloyloxy group and methacryloyloxy group).

The alkenyl group represented by R202 may be a cyclic alkenyl group or open-chain alkenyl group. The open-chain alkenyl group is preferable, and straight chain alkenyl group is more preferable than branched chain alkenyl group. The alkenyl group preferably has 2 to 30 carbon atoms, more preferably 2 to 20, more preferably 2 to 10, more preferably 2 to 8, and most preferably 2 to 6. The alkenyl group may have a substituent. Examples of the substituent are same as those on the alkyl group described in the above.

The aromatic ring group and the heterocyclic group represented by R202 are the same as the aromatic ring and the heterocycle represented by R201, and the same will apply to the preferable ranges. The aromatic ring group and the heterocyclic group may additionally have a substituent. Examples of the substituent are same as the substituents of the aromatic ring and the heterocycle represented by R201.

Specific examples of compounds represented by the general formula (I) are shown below, but not limited thereto.

[Chemical Formula 5]

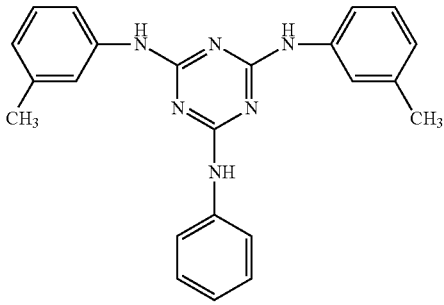

I-(1)

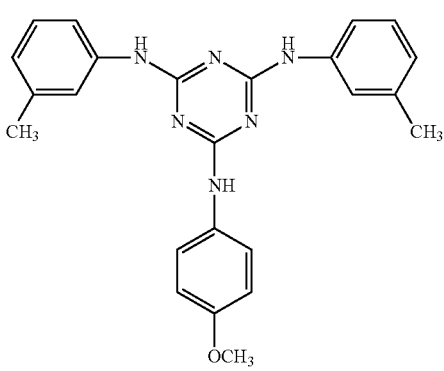

I-(2)

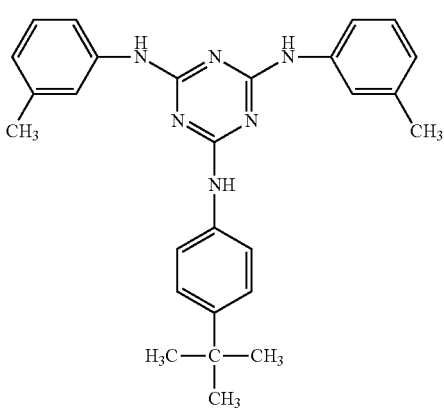

I-(3)

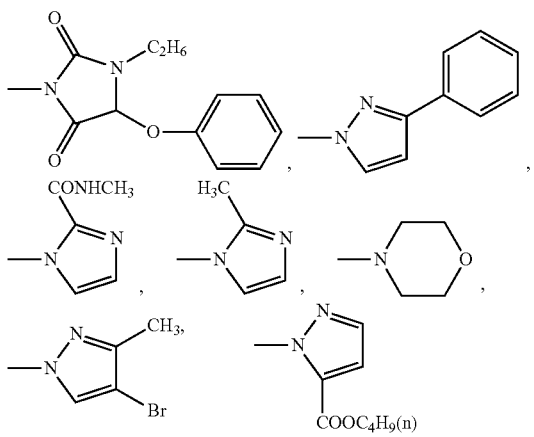

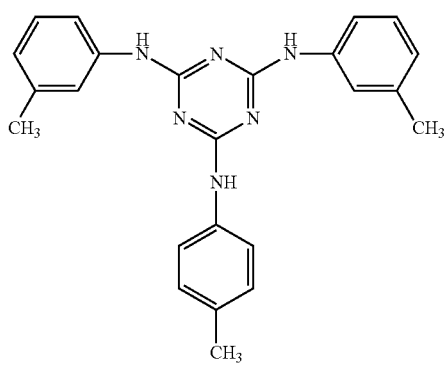
I-(4)
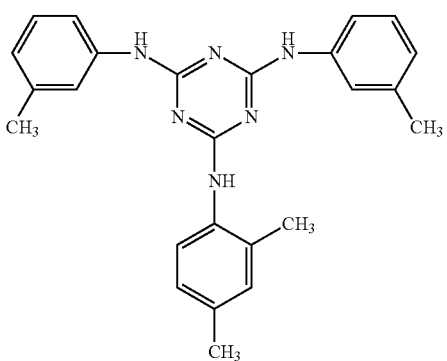
I-(8)
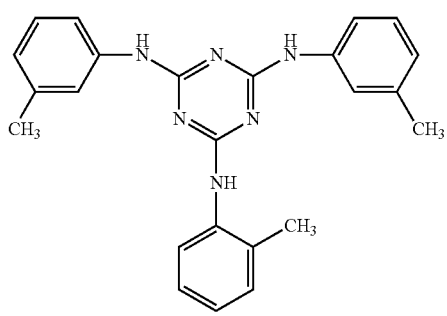
I-(5)
[Chemical Formula 6]
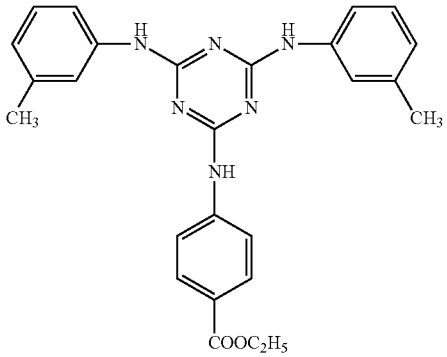
I-(9)
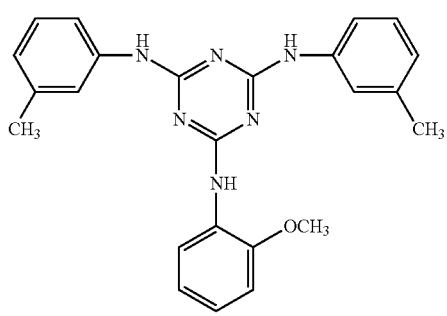
I-(6)
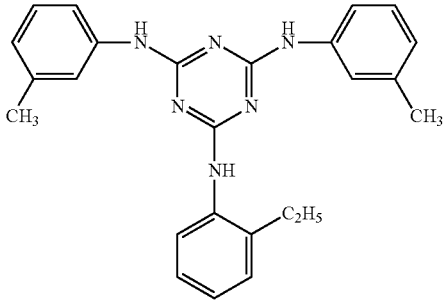
I-(10)
I-(7)
I-(11)

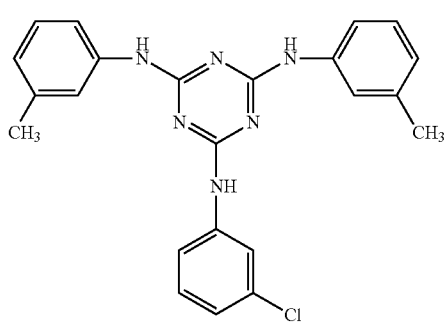
I-(12)
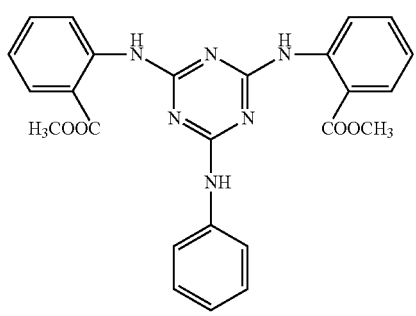
I-(13)
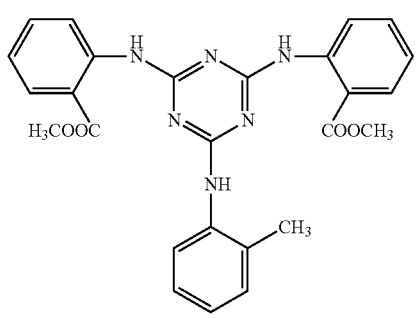
I-(14)
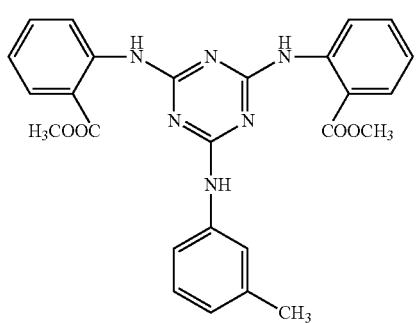
I-(15)
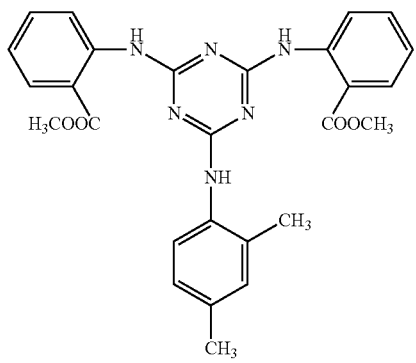
I-(16)
[Chemical Formula 7]
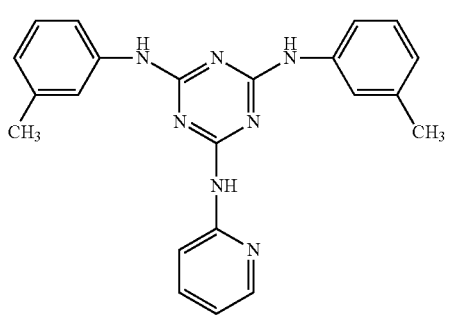
I-(17)
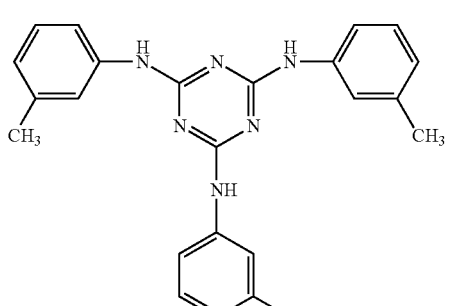
I-(18)
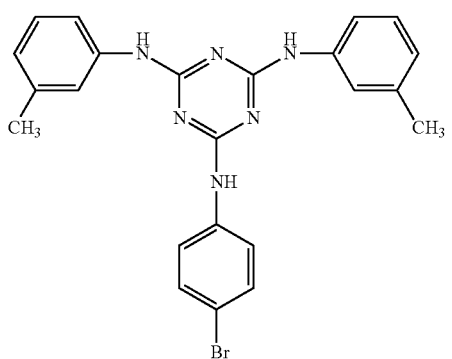
I-(19)
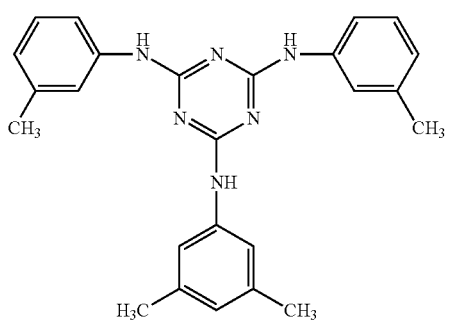
I-(20)

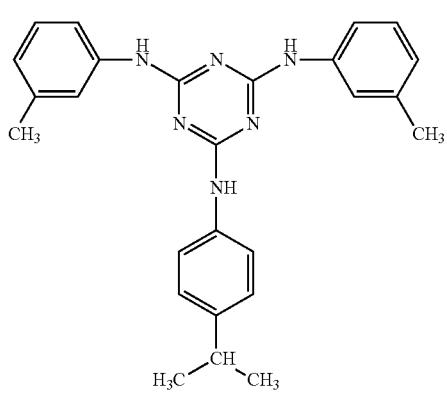
I-(21)
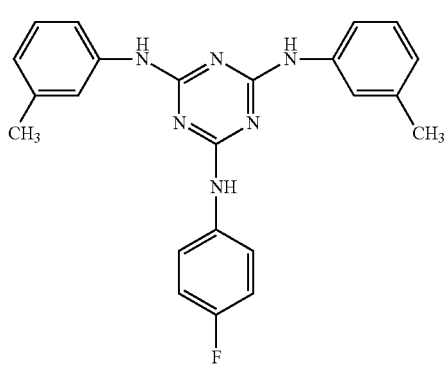
I-(22)
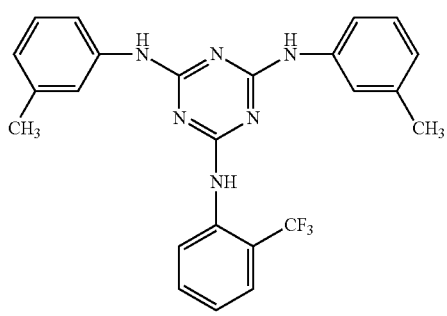
I-(23)
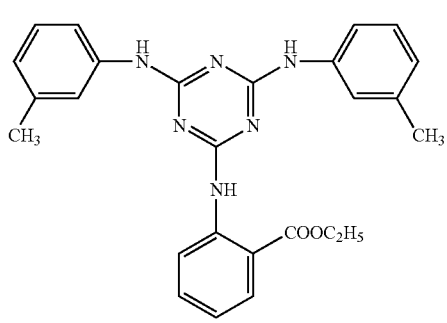
I-(24)
[Chemical Formula 8]
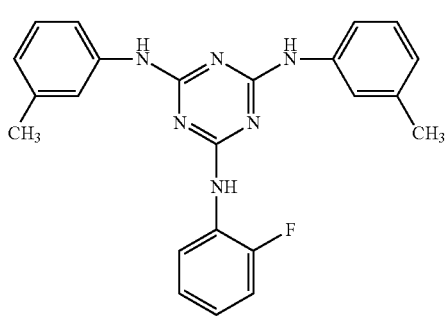
I-(25)
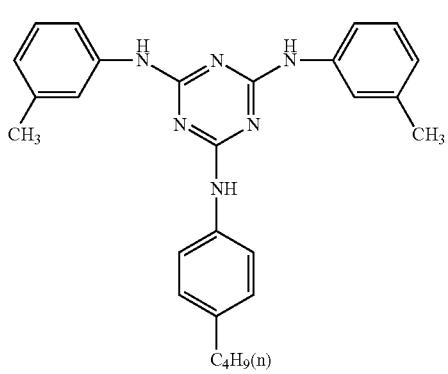
I-(26)
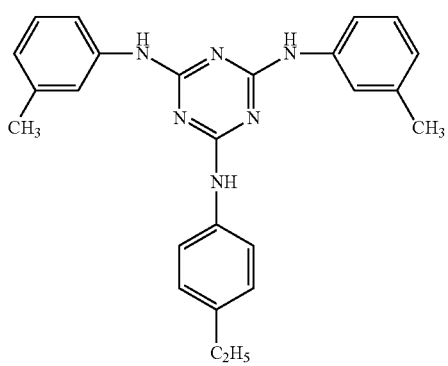
I-(27)
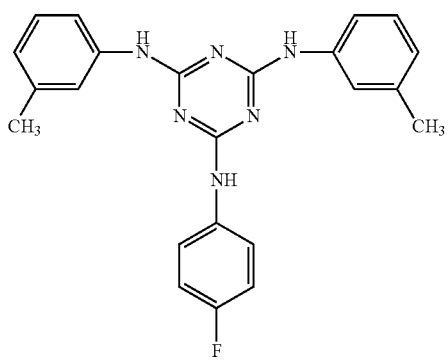
I-(28)

-continued
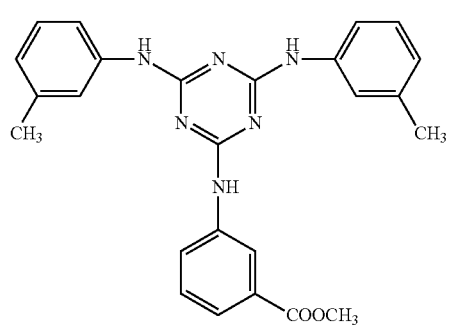
I-(29)
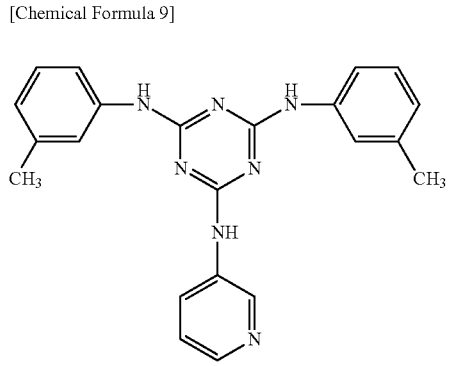
I-(33)
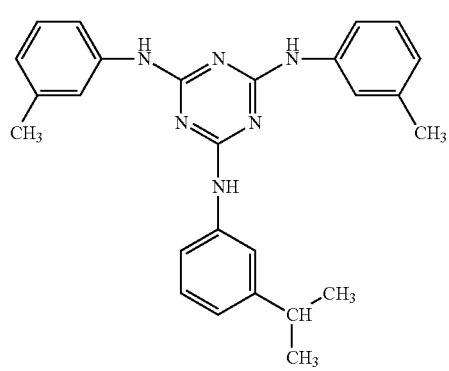
I-(30)
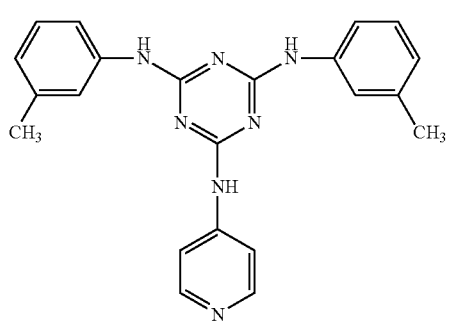
I-(34)
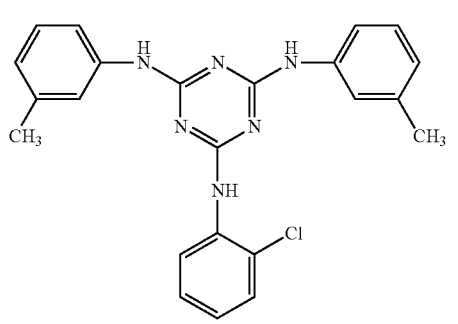
I-(35)
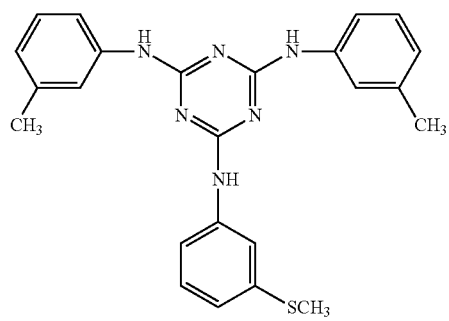
I-(31)
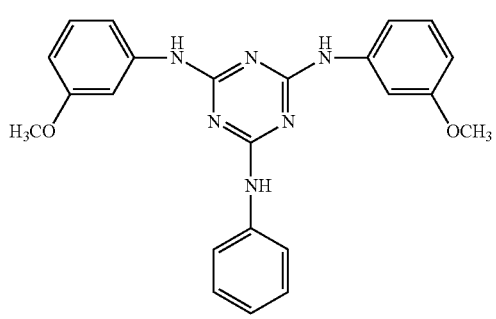
I-(36)
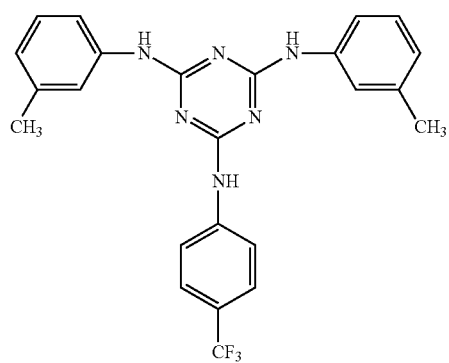
I-(32)
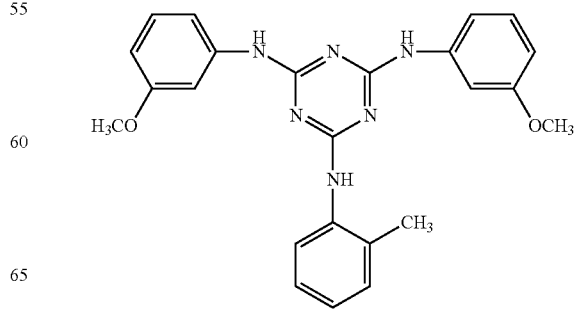
I-(37)

I-(38) 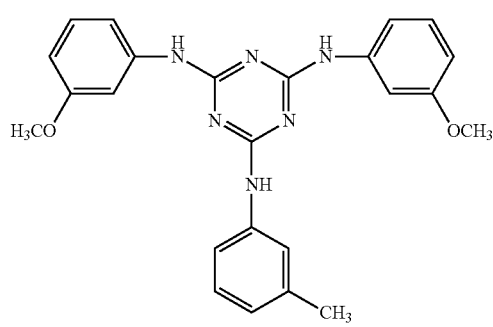
I-(39) 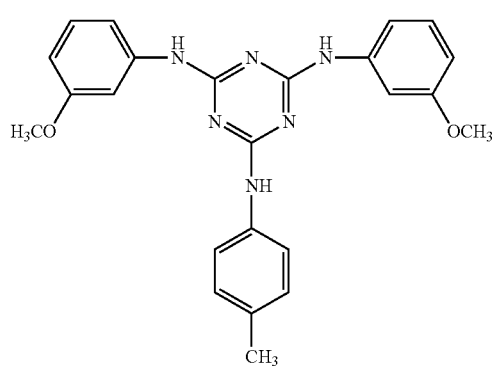
I-(40) 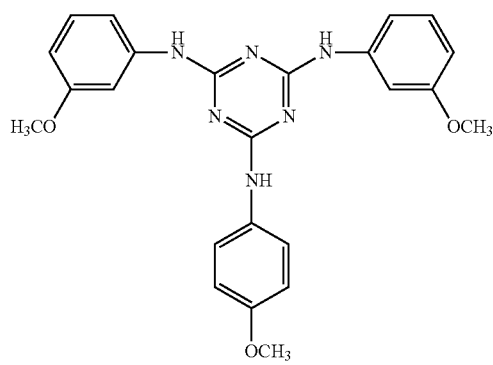
[Chemical Formula 10]
I-(41) 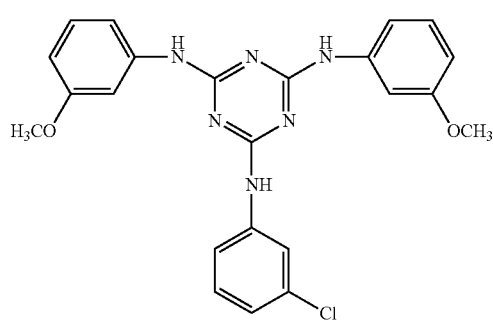
I-(42) 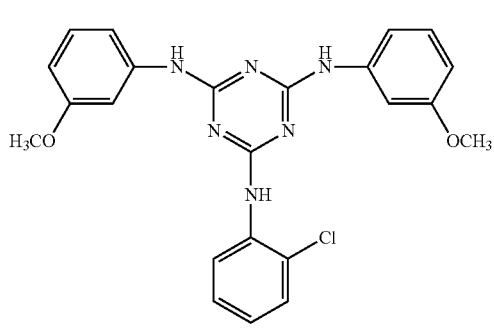
I-(43) 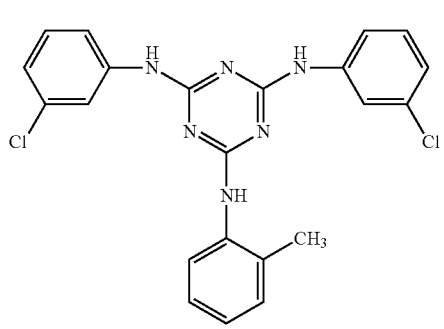
I-(44) 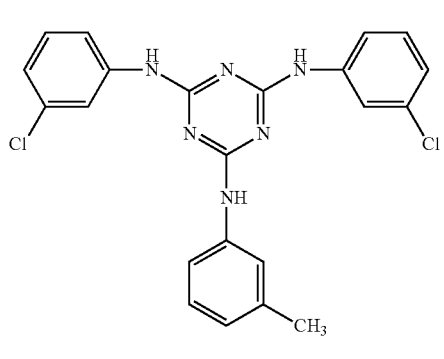
I-(45) 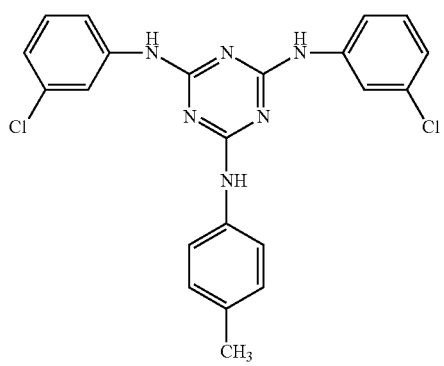

I-(46) 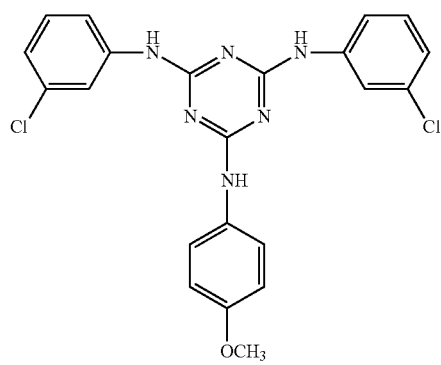
I-(50) 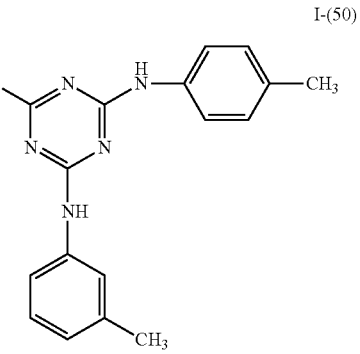
I-(47) 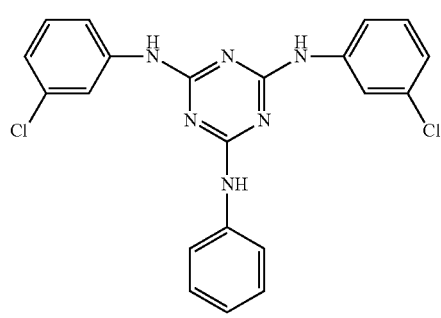
I-(51) 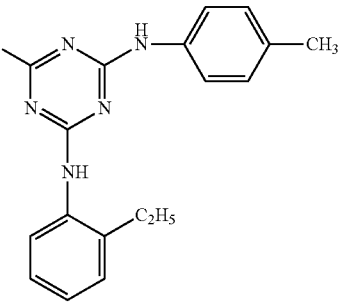
I-(48) 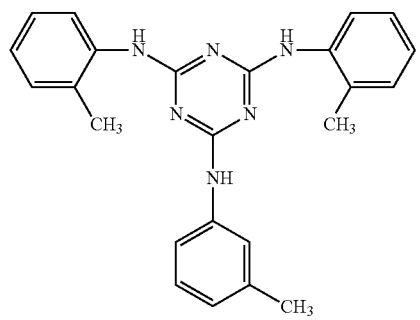
I-(52) 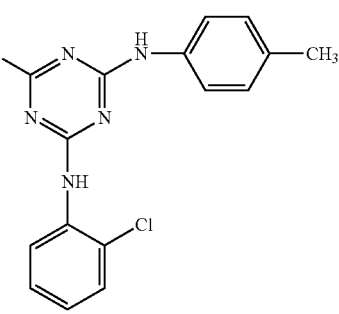
[Chemical Formula 11]
I-(49) 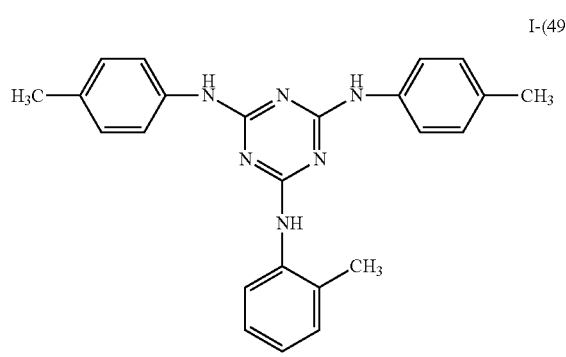
I-(53) 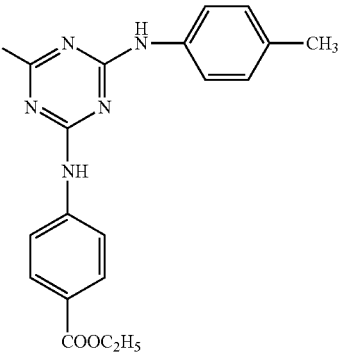

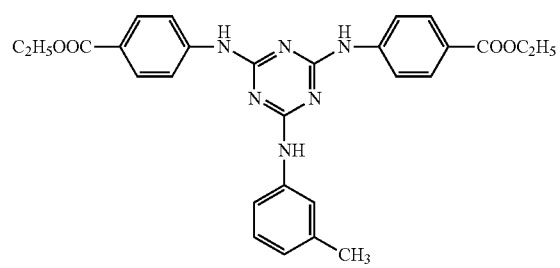
I-(54)
[Chemical Formula 12]
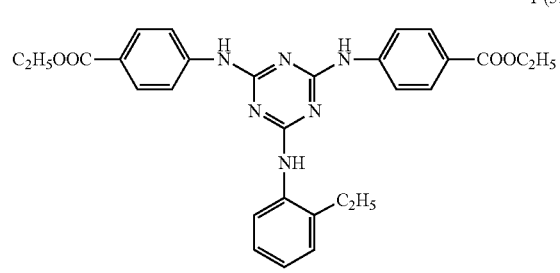
I-(55)
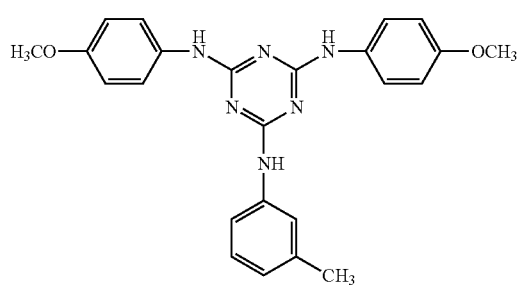
I-(56)
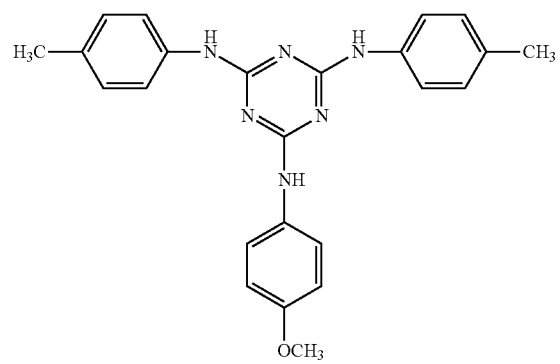
I-(57)
[Chemical Formula 13]
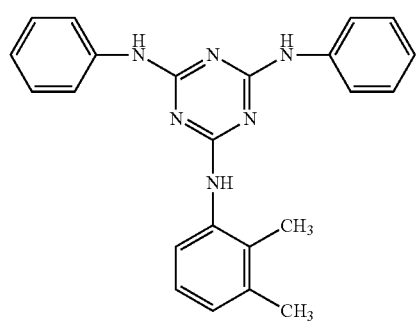
I-(58)
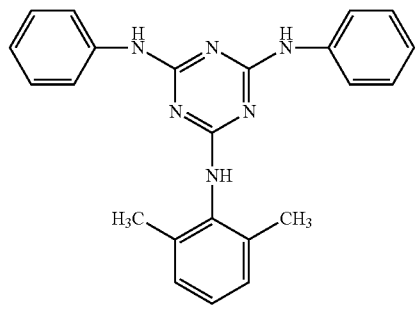
I-(59)
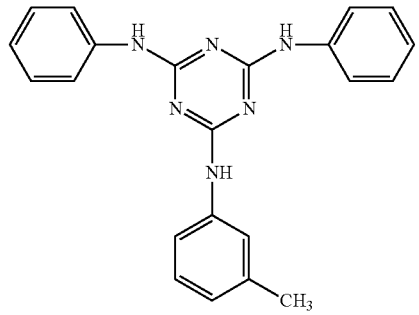
I-(60)
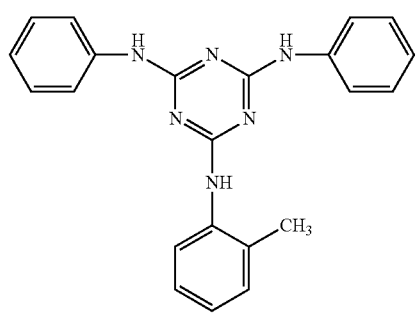
I-(61)
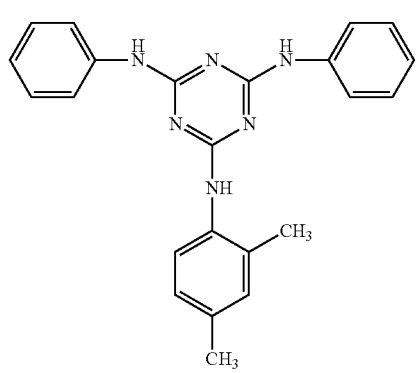
I-(62)
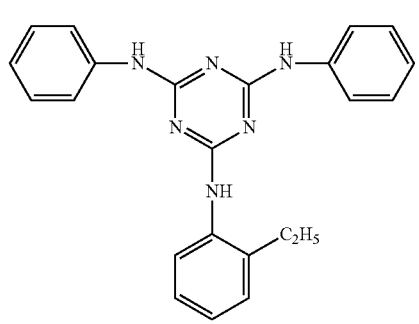
I-(63)

I-(64)
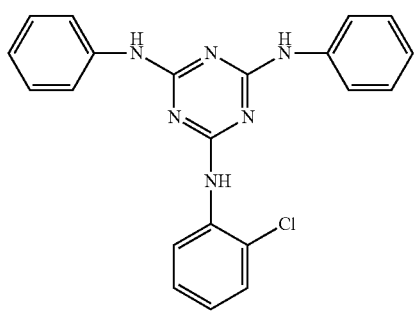
I-(65)
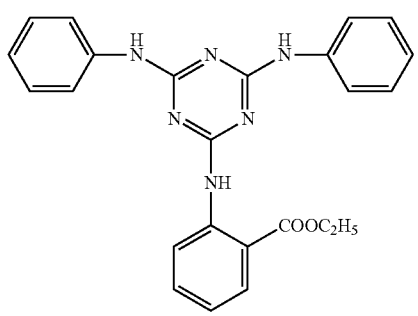
[Chemical Formula 14]
I-(66)
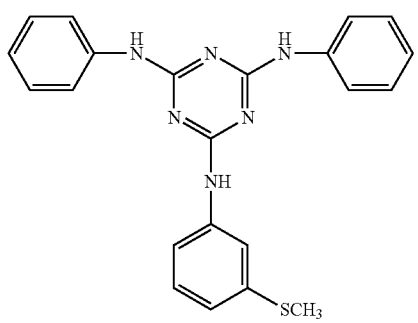
I-(67)
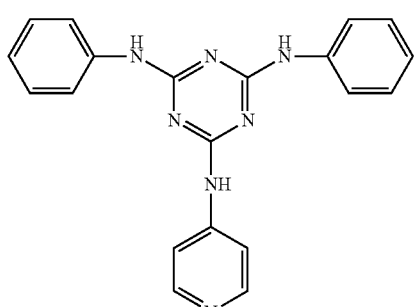
I-(68)
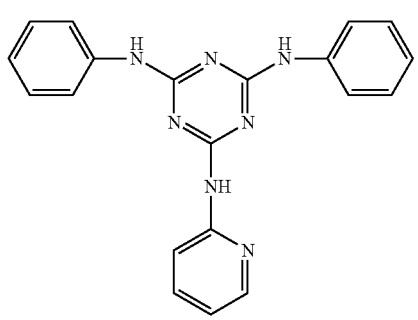
I-(69)
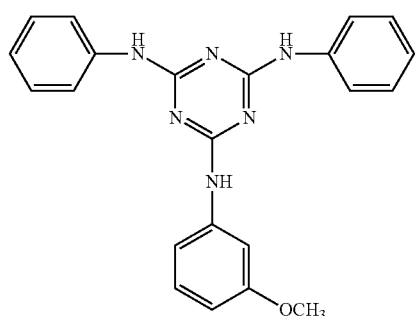
[Chemical Formula 15]
I-(70)
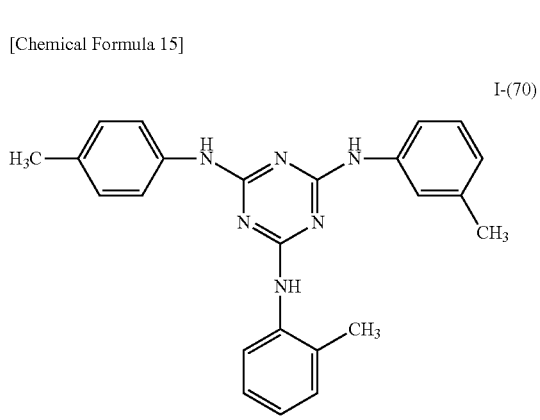
I-(71)
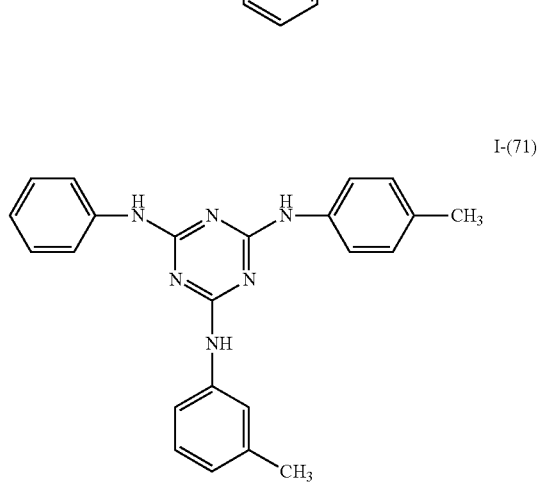
I-(72)
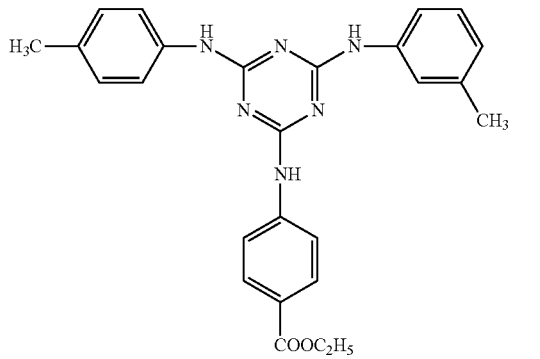

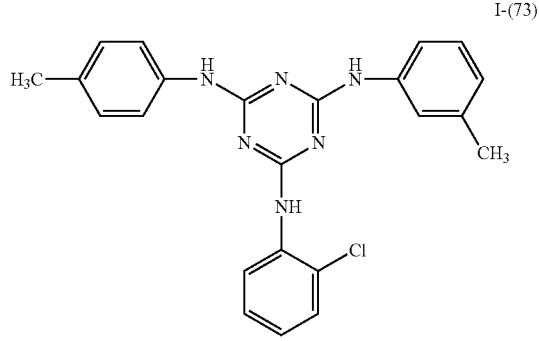

I-(73)

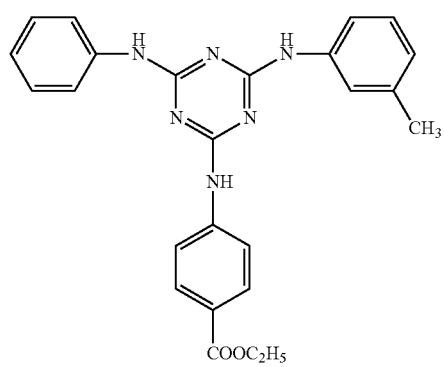

I-(74)

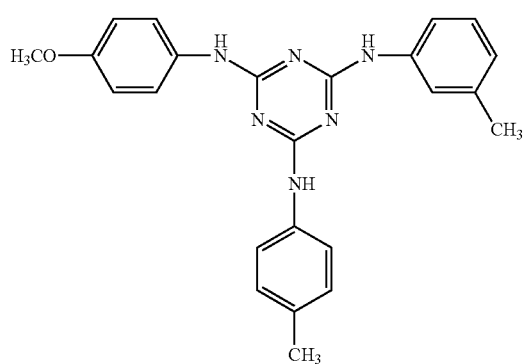

I-(75)

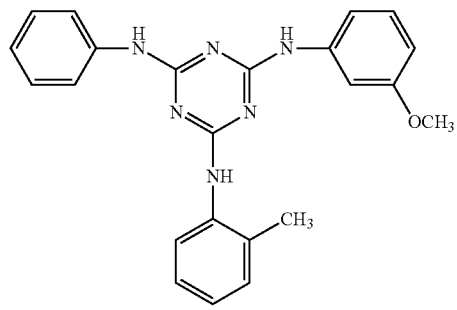

I-(76)

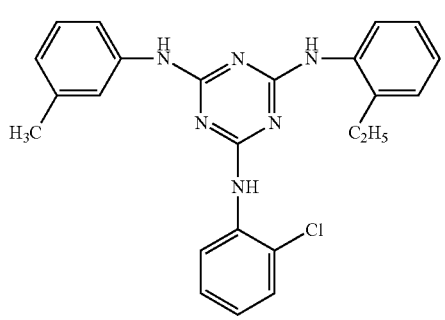

I-(77)

The compound represented by the general formula (I) may be synthesized by any of publicly known methods, for example by a method described in Japanese Laid-Open Patent Publication No. 2003-344655.

Method of addition of the adhesion modifier to a dope may be arbitrary so long as the adhesion modifier is dissolved in the dope. In the present invention, the adhesion modifier is preferably dissolved in a good solvent for cellulose acylate, such as methylene chloride, methyl acetate and dioxolane, or in a mixed organic solvent of the good solvent and a poor solvent such as lower aliphatic alcohol (methanol, ethanol, propanol, butanol, etc.), to be given in a form of adhesion modifier solution, and then added to a cellulose acylate solution to thereby prepare the dope. In this case, it is preferable as possible to make solvent composition of the dope equal to, or similar to solvent composition of the adhesion modifier solution.

<Plasticizer>

The λ/4 plate of the present invention preferably contains a plasticizer and a variety of compounds generally known as plasticizer may be used in a successful manner. The plasticizer used herein is phosphoric ester or carboxylic ester. Representative examples of the phosphoric ester include triphenyl phosphate (TPP) and tricresyl phosphate (TCP). As the carboxylic ester, phthalic ester and citric ester are representative. Examples of the phthalic ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric ester include O-acetyl triethyl citrate (OACTE) and O-acetyl tributyl citrate (OACTB). Other examples of the carboxylic ester include butyl oleate, methylacetyl licinoleate, dibutyl sebacate, and a variety of trimellitic esters. The phthalic ester-based plasticizers (DMP, DEP, DBP, DOP, DPP, DEHP) are preferably used. DEP and DPP are particularly preferable.

(Anti-degradation Agent)

The λ/4 plate of the present invention is preferably added, in the thermoplastic resin solution thereof, with any of publicly known anti-degradation agent (antioxidant), which is exemplified by phenol-based or hydroquinone-based antioxidant such as 2,6-di-tert-butyl-4-methylphenol, 4,4'-thiobis(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, and pentaerythrityl-tetrakis [3-(3,5-di-tert-butyl-4-hydroxyphenyl)propionate]. It is further preferable to add a phosphorus-containing antioxidant such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol diphosphite, and bis(2,4-di-tert-butylphenyl)pentaerythritol diphosphite. Amount of addition of the anti-degradation agent is 0.05 to 5.0 parts by mass per 100 parts by mass of base resin.

(Release Promoting Agent)

The λ/4 plate of the present invention, when manufactured by solution casting, preferably contains a release promoting agent in view of improving releasing property. Content of the release promoting agent may be 0.001 to 1% by mass and more preferably 0.005 to 0.5% by mass, since the releasing agent will preferably be less likely to separate from the film when the amount of addition is 0.5% by mass or less and since a desired level of release suppressing effect will preferably be obtained when the amount of addition is 0.005% by mass or more. The amount addition is more preferably 0.01 to 0.3% by mass. The release promoting agent may be any of publicly known ones, wherein organic and inorganic acidic compounds, surfactant, chelating agent and so forth may be used. Among them, polycarboxylic acid and ester thereof are effective and in particular ethyl ester of citric acid is effectively used.

(Matting Agent)

The λ/4 plate of the present invention is generally added with particles for the purpose of preventing scratching or degradation in conveyability during handling. They are also referred to as matting agent, blocking agent or anti-squeak agent and have been used conventionally. They are not specifically limited so long as they can exhibit these functions and may be any matting agent composed of inorganic compound or organic compound.

Preferable examples of the matting agent composed of inorganic compound include silicon-containing inorganic compound (for example, silicon dioxide, calcined calcium silicate, calcium silicate hydrate, aluminum silicate, magnesium silicate), titanium oxide, zinc oxide, aluminum oxide, barium oxide, zirconium oxide, strontium oxide, antimony oxide, tin oxide, tin-antimony oxide, calcium carbonate, talc, clay, calcined kaolin and calcium phosphate; and more preferable examples include silicon-containing inorganic compounds and zirconium oxide. In particular, silicon dioxide is preferably used since it can reduce turbidity of the cellulose acylate film. Commercially available silicon dioxide particles include those under the trade names of Aerosil R972, R974, R812, 200, 300, R202, OX50, and TT600 (all from Nippon Aerosil Co. Ltd.). Commercially available zirconium oxide fine particles include those under the trade names of Aerosil R976 and R811 (all from Nippon Aerosil Co. Ltd.).

Preferable examples of the matting agent composed of organic compound include polymers such as silicone resins, fluorine-containing resins and acrylic resins and silicone resin is preferably used. Among the silicone resins, those having a three-dimensional network structure are preferable, and commercially available examples of which include those under the trade names of Tospearl 103, Tospearl 105, Tospearl 108, Tospearl 120, Tospearl 145, Tospearl 3120 and Tospearl 240 (all from Toshiba Silicone Co. Ltd.).

The matting agent may be added to the thermoplastic resin solution by any known method without special limitation, so long as a desired thermoplastic resin is obtainable. For example, the additive may be added when the thermoplastic resin and the solvent are mixed or after a solution of the thermoplastic resin and the solvent was prepared by mixing. Still alternatively, the matting agent may be added and mixed into the dope immediately before casting, by so-called, just-in-time addition, wherein mixing is available through installing an in-line screw kneader. More specifically, the screw kneader is preferably a static mixer such as in-line mixer, and the in-line mixer is preferably such as static mixer SWJ (Toray's static type in-pipe Hi-Mixer) (from Toray Engineering Co. Ltd.). As for the in-line addition, Japanese Laid-Open Patent Publication No. 2003-053752 describes an invention regarding a method for manufacturing a thermoplastic resin film, in which distance L between the tip of a feed nozzle, through which an additional liquid having a different composition is mixed into a main source dope, and a leader of an in-line mixer is set not larger than 5 times of the inner diameter d of the pipe for feeding a main source, in order to eliminate non-uniformity in concentration and coagulation of matting particles. A more preferable embodiment described therein is that the distance (L) between the tip opening of the feed nozzle, through which an additional liquid having a composition different from that of the main source dope is fed, and a leader of an in-line mixer is set not larger than 10 times of the inner diameter (d) of the tip opening of the feed nozzle, and that the in-line mixer is a static non-stirring-type in-pipe mixer or a dynamic stirring-type in-pipe mixer. More specifically, it is also disclosed that the ratio of (flow rate of main source dope of thermoplastic resin film)/(flow rate of in-line additional solution) is 10/1 to 500/1, and preferably 50/1 to 200/1. Also Japanese Laid-Open Patent Publication No. 2003-014933, which is directed to provide a phase difference film less causative of bleeding out of additives and separation between layers and excellent in sliding performance and transparency, describes that the additives may be added in a melting kiln, or that the additives or liquid solution having the additives dissolved or dispersed therein may be added to the dope during transfer thereof between the melting kiln and a co-casting die, and the latter case is preferably provided with a mixing means such as a static mixer in order to enhance miscibility.

In the λ/4 plate of the present invention, the matting agent will not increase haze of the film so distinctively so long as the amount of addition thereof is not so large, and will be less causative of lowered contrast or generation of bright dots when it is practically used for LCD. Also squeaking and anti-frictional performance may be implemented so long as the amount of addition thereof is not too small. From these points of view, content of the matting agent is preferably in the range from 0.01 to 5.0% by mass, more preferably from 0.03 to 3.0% by mass, and particularly from 0.05 to 1.0% by mass.

<Method of Manufacturing λ/4 Plate>

The λ/4 plate of the present invention, as a film containing a thermoplastic resin, may be manufactured either by solution casting or melt casting. The solution casting is more preferable.

The method for manufacturing will be explained below, referring to a cellulose acylate film which is suitable for the λ/4 plate of the present invention. (The cellulose acylate film will be explained below as the λ/4 plate of the present invention.)

The cellulose acylate film used for the present invention is manufactured by a step of preparing a dope by dissolving cellulose acylate and additives in a solvent; a step of casting the dope over a belt-shape or drum-shape metal support; a step of drying the cast dope to form a web; a step of separating the web from the metal support; a step of stretching; a step of further drying; an optional step of further heat-treating the obtained film; and a step of cooling and winding up the film. The cellulose acylate film used for the present invention contains 60 to 95% by mass of cellulose acylate on the solid content basis.

(Preparation of Dope)

Procedures for preparing the dope will be described. While a higher concentration of cellulose acylate in the dope is preferable in view of reducing the load of drying after being cast over the metal support, whereas an excessively high concentration of cellulose acylate will increase the load of filtration and will degrade accuracy of filtration. The concentration capable of balancing the needs preferably falls in the range from 10 to 35% by mass, and more preferably from 15 to 25% by mass.

While solvent of the dope used for the present invention may be of single species or two or more species used together, it is preferable to use a good solvent and a poor solvent of cellulose acylate in a mixed manner from the viewpoint of production efficiency, and the good solvent is preferably used in a larger volume from the viewpoint of solubility of cellulose acylate. Ratio of mixing of the good solvent and the poor solvent is preferably such that the good solvent accounts for 70 to 98% by mass, and the poor solvent accounts for 2 to 30% by mass. The good solvent herein is defined as a solvent which solubilizes cellulose acylate to be used alone by itself, whereas the poor solvent is defined as a solvent which cannot swell or solubilize it alone by itself. Accordingly, the good solvent and the poor solvent may change depending on the degree of acetyl substitution of cellulose acylate, for example such that acetone is a good solvent for cellulose acetate with a degree of acetyl substitution of 2.4, but is a poor solvent for cellulose acetate with a degree of acetyl substitution of 2.8.

The good solvent used for the present invention is exemplified by organohalogen compound such as methylene chloride, as well as dioxolanes, acetone, methyl acetate, and acetomethyl acetate, although not specifically limited. Particularly preferable examples include methylene chloride and methyl acetate.

The poor solvent used for the present invention is exemplified by methanol, ethanol, n-butanol, cyclohexane, and cyclohexanone, although not specifically limited. The dope preferably contains 0.01 to 2% by mass of water.

In the process of preparing the dope, cellulose acylate may be dissolved by general method. By combining heating and pressurizing, the dope may be heated at and above the boiling point at normal pressure. Dissolution by stirring, under heating at a temperature higher than the boiling point at normal pressure of the solvent, and up to a degree not causative of boiling of the solvent under pressure, is preferable in view of preventing formation of blocky undissolved component called gel or lump. Alternatively, it is also preferable that cellulose acylate is mixed with the poor solvent so as to be preliminarily moistened or swelled, and is then further added with a good solvent for dissolution.

Pressurizing may be available through compression feeding of an inert gas such as nitrogen gas, or through elevating vaporizing pressure of solvent under heating. Heating is preferably given from the external, typically using a jacket-type apparatus which is convenient for temperature control.

Heating temperature after addition of the solvent is preferably higher from the viewpoint of solubility of cellulose acylate, but excessively high heating temperature will degrade the productivity since required pressure also increases. The heating temperature is preferably 45 to 120° C., more preferably 60 to 110° C., and furthermore preferably 70° C. to 105° C. The pressure is adjusted so as to avoid boiling of the solvent at the set temperature.

Alternatively, dissolution under cooling is preferably used, by which cellulose acylate may be dissolved into solvent such as methyl acetate.

Next, the cellulose acylate solution is filtered using an appropriate filter medium such as filter paper. The filter medium preferably has a small value of absolute filter rating in view of eliminating insoluble matter, whereas an excessively small absolute filter rating will unfortunately result in clogging of the filter medium. Accordingly, the filter medium preferably has an absolute filter rating of 0.008 mm or smaller, more preferably from 0.001 to 0.008 mm, and furthermore preferably from 0.003 to 0.006 mm.

The filter medium may be of any material without special limitation, and is arbitrarily selectable from general filter media and filter media made of plastic such as polypropylene or Teflon (registered trademark), and made of metal such as stainless steel are preferable in view of avoiding fall-out of fiber. It is preferable to eliminate contaminant, in particular bright dot contaminant, contained in the source cellulose acylate by filtration.

The bright dot contaminant refers to a contaminant appeared as bright dots due to leakage of light therethrough from the opposite side, when two polarizing plates are arranged in crossed Nichol configuration while placing a cellulose acylate film in between, and the cellulose acylate film is observed from the side of one polarizing plate while irradiating the stack with light from the side of the other polarizing plate. The number of bright dots having a diameter of 0.01 mm or larger is preferably 200 dots/$cm^2$ or smaller, more preferably 100 dots/$cm^2$ or smaller, still more preferably 50 dots/$m^2$ or smaller, and furthermore preferably 0 to 10 dots/$cm^2$ or smaller. It is also preferable that there is only a few bright dots with a diameter of 0.01 mm or smaller.

The dope may be filtered by any of general methods, wherein it is preferable to filter it at a temperature not lower than the boiling point under normal pressure of the solvent and up to a degree not causative of boiling of the solvent under pressure, in view of suppressing increase in difference in filtering pressure before and after filtration (referred to as pressure difference). The temperature is preferably in the range from 45 to 120° C., more preferably from 45 to 70° C., and furthermore preferably 45 to 55° C.

The smaller the filtering pressure, the better. The filtering pressure is preferably 1.6 MPa or below, more preferably 1.2 MPa or below, and furthermore preferably 1.0 MPa or below.

Casting of the dope will be explained in the next.

In the present invention, the cellulose acylate film preferably contains 90% by mass or more relative to the total content of the adhesion modifier of the present invention within a 50% range in the thickness-wise direction of the cellulose acylate film from the interface side with the hard coat layer in view of obtaining the effect of the present invention. The content may be determined by grinding off the surface of the film in the thickness-wise direction and by quantifying the amount of the adhesion modifier contained in the ground residue.

The cellulose acylate film is preferably a stack of two or more layers formed by co-casting, which has a film layer on the hard coat layer side of 0.5 to 10 μm thick, and the film layer on the hard coat layer side contains 90% by mass or more relative to the total content in the cellulose acylate film of the adhesion modifier.

The above-described distribution of the adhesion modifier in the cellulose acylate film used for the present invention may be implemented by preparing a dope containing the adhesion modifier and a dope not containing it, and by co-casting or sequentially casting both dopes to thereby form the layered film.

(Co-Casting)

In the present invention, the prepared cellulose acylate solution (dope) is preferably formed into the film by casting two or more preparations of cellulose acylate solution onto a smooth band or drum as a support.

The two or more preparations of dope may be cast onto the support simultaneously or independently. In the sequential casting characterized by independent casting, the dope on the support side is cast first and allowed to dry on the support to a certain degree, and the next dope is cast thereon. For the case of using three preparations or more dope, the layered film may also be manufactured by appropriately combining the simultaneous casting (also referred to as co-casting) and sequential casting. These film-manufacturing methods based on the co-casting or sequential casting are characterized by an ambiguous interface between the individual layers in the layered structure, that is, the layered structure is not clearly observed in the cross section, unlike the method of coating the dope on a dry film, which yields an effect of enhancing adherence between the individual layers.

The method for manufacturing of a cellulose acylate film used for the present invention is preferably implemented by co-casting from the viewpoint of productivity, for which any of publicly-known method of co-casting may be used. For example, the film may be manufactured while casting the cellulose acylate-containing solutions through a plurality of casting ports disposed at intervals in the direction of travel of the metal support so as to stack layers. Applicable methods include those described, for example, in Japanese Laid-Open Patent Publication No. S61-158414, ibid. No. H01-122419, and ibid. No. H11-198285. Alternatively, the cellulose acylate solution may be cast through two casting ports to form the film. Applicable methods include those described, for example, in Examined Japanese Patent Publication No. S60-27562, Japanese Laid-Open Patent Publication Nos. S61-94724, ibid. No. S61-947245, ibid. No. S61-104813, ibid. No. S61-158413, and ibid. No. H06-134933. Another applicable method is a cellulose acylate film casting process described in Japanese Laid-Open Patent Publication No. S56-162617, according to which stream of a high-viscosity cellulose acylate solution is surrounded by a low-viscosity cellulose acylate solution, and these high- and low-viscosity cellulose acylate solutions are simultaneously extruded. Still other preferable methods are described in Japanese Laid-Open Patent Publication No. S61-94724 and ibid. No. S61-94725, according to which the outer solution contains a larger amount of alcoholic component, which is a poor solvent, than the inner solution.

Still alternatively, the film may be manufactured by using two casting ports, according to which a film formed under a first casting port on the metal support is separated, and on the surface of the film having been brought into contact with the metal support, the next film is formed under a second casting port, as described in Examined Japanese Patent Publication No. S44-20235.

Figure 2:
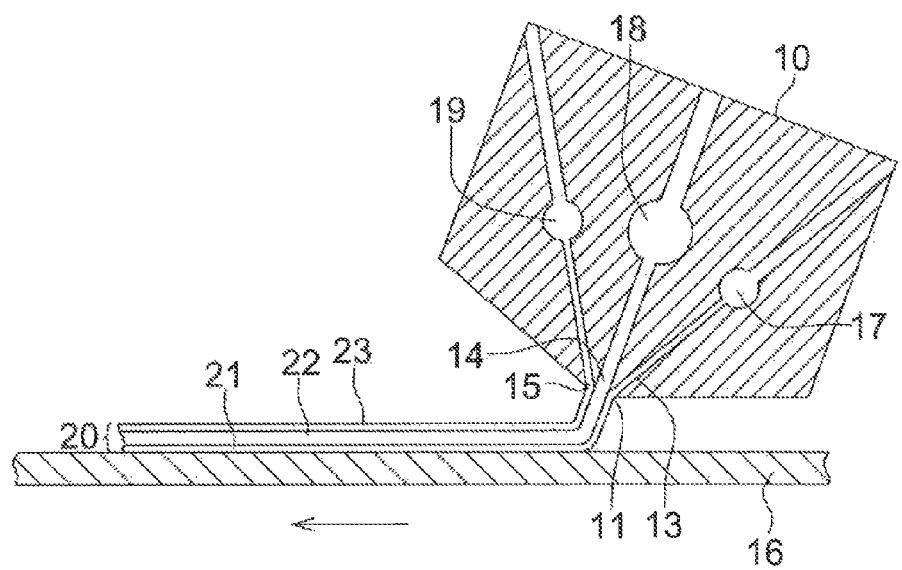
FIG. 2 is a schematic drawing illustrating a λ/4 plate die, and a multi-layered web as produced.

FIG. 2 is a schematic drawing illustrating a co-casting die, and a multi-layered web as produced (the web may be referred to as a dope film, immediately after casting). In the co-casting, as illustrated in FIG. 2, a mouthpiece 11 of a co-casting die 10 has a plurality (three in FIG. 2) of skin layer-forming slits 13, 15 and a core layer-forming slit 14, through which a skin layer-forming dope 17, a core layer-forming dope 18, and a skin layer-forming dope 19 are simultaneously cast over a metal support 16, to thereby form a multi-layered web 20 with a configuration of skin layer 21/core layer 22/skin layer 23.

The cellulose acylate solutions to be cast may be same or different, wherein different cellulose acylate solutions are preferably used in view of creating a distribution of the adhesion modifier. In order to respectively functionalize the plurality of cellulose acylate layers, the cellulose acylate solutions corresponded to the individual functions are cast through the respective casting ports. The cellulose acylate solution for the present invention may simultaneously be co-cast together with other functional layer(s) (adhesive layer, dye layer, antistatic layer, anti-halation layer, UV absorbing layer, polarizing layer, etc.). The method for manufacturing the film of the present invention is preferably a multi-layer casting characterized by simultaneous or sequential formation of film.

While thickness of the inner and outer layers in the co-casting is not specifically limited, the thickness of the film layer on the hard coat layer side is preferably 0.5 to 10 μm. The film layer on the hard coat layer side preferably contains 90% by mass or more, relative to the total content in the cellulose acylate film, of the adhesion modifier, or in terms of content, 0.05 to 5 parts by mass per 100 parts by mass of the cellulose acylate film. When the adhesion modifier is distributed more abundantly in a portion closer to the hard coat layer side in the film, and when the portion is as thin as ½₅ to ¹⁄₁₀ of the film thickness, the cellulose acylate film will contain a larger amount of adhesion modifier as compared with the film having the adhesion modifier uniformly distributed therein, while keeping a level of UV transmissivity required for the sealing layer.

As will be understood from the above, it is also possible to manufacture a cellulose acylate film with a desired layered structure, by co-casting cellulose acylate solutions different in concentration and species of additives such as an adhesion modifier, plasticizer, matting agent and so forth.

In the present invention, the dope cast in a multi-layered manner is dried, and then separated from the support.

The dope is cast over the drum or metal support, and the solvent therein is allowed to vaporize, so as to obtain the film. The dope before being cast is preferably adjusted in the concentration so that the solid content falls in the range from 18 to 35% by mass. The drum or metal support is preferably finished to have a mirror surface in advance. Methods of casting and drying in the solvent cast process are described in U.S. Pat. No. 2,336,310, ibid. No. 2,367,603, ibid. No. 2,492,078, ibid. No. 2,492,977, ibid. No. 2,492,978, ibid. No. 2,607,704, ibid. No. 2,739,069, ibid. No. 2,739,070, British Patent No. 640731, ibid. No. 736892, Japanese Examined Patent Publication No. S45-4554, ibid. No. S49-5614, Japanese Laid-Open Patent Publication No. S60-176834, ibid. No. S60-203430, ibid. and No. S62-115035.

The dope is preferably cast over the drum or metal support with a surface temperature of 10° C. or below. The dope is preferably dried by blowing air over 2 seconds or longer. The obtained film is separated from the drum or metal support, and is further dried by hot air at step-wisely elevated temperatures from 100° C. to 160° C. so as to vaporize the residual solvent. The above-described method is described in Examined Japanese Patent Publication No. H05-17844. According to the method, length of time from the casting to the separation may be reduced. For implementation of the method, the dope has to gellate at surface temperature of the drum or the metal support during the casting.

The metal support used in the casting process is preferably mirror-finished, for which a stainless steel belt or a die-cast drum finished by plating is preferably used. Width of casting may be set to 1 to 4 m. Surface temperature of the metal support in the casting process is set to −50° C. or above and up to a temperature at which the solvent does not boil or foam. While higher temperature is preferable in view of accelerating drying speed of the web, an excessively high temperature may induce foaming of the web or may degrade the flatness. Temperature of the support is appropriately set in the range from 0 to 100° C., and more preferably from 5 to 30° C. Another preferable method is such as cooling and thereby gellating the web, and then separating the web with much residual solvent contained therein from the drum. Methods of controlling the temperature of the metal support is not specifically limited, and examples of which include a method of blowing hot air or cold air, and a method of bringing warm water into contact with the back surface of the metal support. The method of using warm water is preferable, since the method ensures an efficient heat conduction, and shortens the length of time over which the temperature of the metal support becomes constant. When hot air is used, temperature of the hot air is occasionally set not lower than the boiling point of the solvent, and may be set even higher than a target temperature while suppressing foaming, in consideration of temperature fall of the web due to latent heat of evaporation of the solvent. In particular, it is preferable to effectively dry the web, by varying the temperature of the support and dry air over the duration from the casting to the separation.

In order to ensure an excellent flatness of the cellulose acylate film used for the present invention, the amount of residual solvent in the web, when it is separated from the metal support, is preferably 10 to 150% by mass, more preferably 20 to 40% by mass or 60 to 130% by mass, and particularly 20 to 30% by mass or 70 to 120% by mass. Temperature of the metal support at the position of separation is preferably −50 to 40° C., more preferably 10 to 40° C., and most preferably 15 to 30° C.

In the present invention, the amount of residual solvent is given by the equation below.

Amount of residual solvent (% by mass)=$\{(M-N)/N\} \times 100$ where, M represents mass of a sample of the web or film, collected at an arbitrary point of time during manufacturing or after manufacturing. N represents mass of M after heated at 115° C. for 1 hour.

In the drying step of the cellulose acylate film, the web is separated from the metal support and further dried until the amount of residual solvent is reduced down to 0.5% by mass or below.

In the drying process of the film, the web is generally dried while being conveyed, according to a roll drying system (a system of drying which allows the web to alternately travel around a large number of rolls disposed vertically), or a tenter system.

When the web is separated from the metal support, the web is stretched longitudinally due to tension applied in the process of separation and conveyance thereafter. It is therefore preferable for the present invention to separate the web from the support of casting while suppressing the tension of separation and conveyance as possible. More specifically, the tension is preferably suppressed to 50 to 170 N/m or below. In this process, it is preferable to rapidly immobilize the web by blowing it with a cool air at 20° C. or below.

The cellulose acylate film is adjustable in terms of refractive index (refractive index nx in the direction of in-plane phase retardation axis, refractive index ny in the direction normal to the in-plane phase retardation axis, and refractive index nz in the width direction) by further stretching.

Methods besides the co-casting include a method of providing an adhesion modifier layer by coating, as described later.

(Stretching Process)

The λ/4 plate of the present invention preferably has an in-plane phase difference Ro (590), measured at 590 nm of a wavelength, in the range from 110 to 170 nm. The retardation is preferably created by stretching of the film.

Methods of stretching are not specifically limited. Examples of the method include a method of longitudinally stretching the web among a plurality of rolls making use of difference in peripheral speeds of the rolls; a method of longitudinally stretching the web while being held at both edges thereof with clips or pins and spreading the distance between the clips or pins in the direction of travel; a method of transversely stretching the web, in the same way but in the transverse direction; and a method of stretching the web both in the longitudinal and transverse directions by stretching the web longitudinally and transversely at the same time. Of course these methods may be combined. In other words, the web may be stretched transversely, longitudinally or in both directions relative to the direction of film making. The stretching in both directions may be implemented simultaneously or sequentially. Note that, in a so-called tenter process, operation of clip portions according to the linear drive system ensures smooth stretching and is therefore preferable since rupture of the web is avoidable.

In the present invention, the web is preferably stretched in the direction of conveyance making use of difference in the peripheral speeds of the conveying rolls of the film, or using the tenter process by which both ends of the web is held using the clips or the like in the direction orthogonal to the direction of conveyance (also referred to as widthwise direction or TD direction). It is also preferable to use a tenter capable of varying length of holding (distance between a start point of holding and an end point of holding) of the web, independently by the left and right holding means.

In the present invention, it is also preferable to stretch in the stretching process either the λ/4 plate of the present invention or polarizer in the direction 45° away from the direction of conveyance of the film.

This is because, when the angle between the longitudinal direction and in-plane phase retardation axis of the λ/4 plate composed of a rolled polymer film is substantially 45°, the λ/4 plate, which is to be provided on the surface of a display device of VA type, IPS type or the like having a polarizing plate with the polarization axis thereof aligned in parallel with the long-edge direction or the short-edge direction thereof, can be cut out from the long rolled web in the longitudinal direction or in the width direction, which ensures an advantage in the productivity only with a small loss of cutting.

The λ/4 plate, characterized in that the angle between the longitudinal direction and the in-plane phase retardation axis is substantially 45°, may be manufactured by stretching the rolled cellulose acylate film in the direction substantially 45° inclined from the longitudinal direction.

The methods of stretching in the 45° direction will be explained below.

Figure 3:
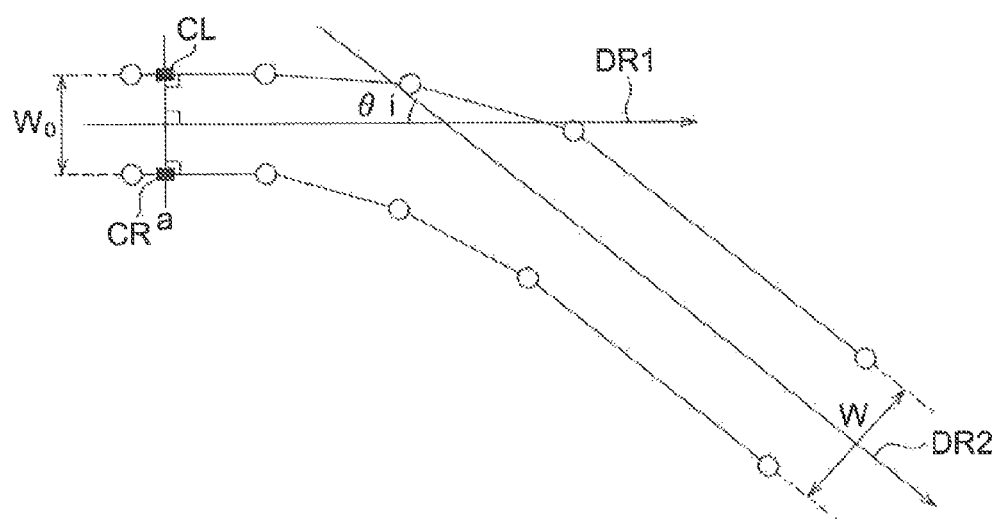
FIG. 3 is a schematic drawing illustrating oblique stretching using a tenter.

For the purpose of stretching the cellulose acylate film in the direction substantially 45° inclined from the longitudinal direction, a tenter illustrated in FIG. 3 is preferably used. FIG. 3 is a schematic drawing illustrating oblique stretching using a tenter.

A stretched film is manufactured using a tenter. The tenter is an apparatus of expanding the width of the film unrolled from a film roll (feeding roll), in a direction inclined away from the direction of travel (direction of movement of the middle point in the width direction), under an environment heated by an oven. The tenter has the oven, a left-and-right pair of rails along which clips for conveying the film travel, and the large number of clips which travel on the rails. The film unrolled from the film roll and successively fed to the entrance of the tenter is held at both edges thereof by the clips, guided into the oven, and then released from the clips at the exit of the tenter. The film released from the clips is taken up around a winding core. Each of the pair of rails has an endless continuous orbit and is configured to allow the clips, which released the film at the exit of the tenter, to travel externally to successively return back to the entrance.

Geometry of the rails of the tenter is asymmetrical between the left and right, depending on alignment angle to be given to the stretched film to be manufactured, and stretching ratio, and is finely adjustable manually or automatically. In the present invention, the rails are configured to stretch the long thermoplastic resin film so as to adjust the alignment angle θ with respect to the wind-up direction after the stretching at an arbitrary angle within the range from 40° to 80°. In the present invention, the clips of the tenter are configured to travel at a constant speed while respectively keeping a constant distance from the clips before and after.

FIG. 3 illustrates an orbit of the rails (rail pattern) of the tenter used for oblique stretching. Feed direction DR1 of the cellulose acylate film is different from wind-up direction (MD direction) DR2 of the film after stretching, and thereby uniform optical characteristics may be obtained over a large width even for a stretched film with a relatively large alignment angle. Feed angle (unrolling angle) θi refers to an angle between the feed direction DR1 of the film before being stretched and the wind-up direction DR2 of the stretched film. In the present invention, in order to manufacture a film having an alignment angle of 40° to 80°, the feed angle θi is set to 10°<θi<60°, and preferably 15°<θi<50°. By adjusting the feed angle θi in the above-described ranges, variation in optical characteristics in the width-wise direction of the resultant film may be improved (reduced).

The cellulose acylate film unrolled from the film roll (feeding roll) is successively held at both ends (both edges) thereof by the left and right clips at the entrance of the tenter (position indicated by symbol "a"), and is conveyed as the clips travel. The left and right clips CL, CR, which are opposed in the direction nearly normal to the direction of travel of the film (feed direction DR1) at the entrance of the tenter (position indicated by symbol "a"), travel along the left and right asymmetrical rails, and through a preheating zone, stretching zone, and a heat setting zone. "Nearly normal" herein means that an angle formed between a line connecting the opposing clips CL, CR and the film feed direction DR1 falls in a range of 90±1°.

The preheating zone is a section in the entrance portion of the oven, over which the clips travel while holding both edges of the film and keeping a constant distance in between. The stretching zone is a section over which the distance between the clips which hold both edges of the film begins to increase and then kept at constant again. The cooling zone is a section over which the temperature therein is set not higher than the glass transition temperature Tg (° C.) of the thermoplastic resin which composes the film, in the period in which the distance between the clips becomes constant again after the stretching zone.

With respect to the glass transition temperature Tg of the thermoplastic resin, the temperature of the preheating zone is preferably adjusted to Tg+5 to Tg+20° C., the temperature of the stretching zone is preferably adjusted to Tg to Tg+20° C., and the temperature of the cooling zone is preferably adjusted to Tg−30 to Tg (° C.).

Stretching ratio R (W/Wo) in the stretching step is preferably adjusted to 1.3 to 3.0-fold, and more preferably 1.5 to 2.8-fold. The stretching ratio fallen in these ranges successfully reduces variation in the thickness in the width direction. If the stretching temperature is varied in the width direction in the stretching zone of the tenter stretcher, variation in the thickness in the width-wise direction will further be reduced. Here, Wo means film width before stretching, and W means film width after stretching.

The oblique stretching may take place in the filmmaking step (on-line), or may be effected by the tenter on the film once taken up and then unrolled (off-line).

Means for drying the web is not specifically limited. The drying may generally be implemented by hot air, infrared radiation, heat roll, microwave and so forth. Hot air is preferable by virtue of its simplicity.

In the drying step of the web, it is effective to anneal the web at a drying temperature lower by 5° C. or more than the glass transition temperature of the film and 100° C. or above for 10 minutes or longer and 60 minutes or shorter. The drying temperature is preferably 100 to 200° C., and more preferably 110 to 160° C.

After a predetermined heat treating, the web is preferably slit off at both edges by a slitter before being taken up, for better aesthetics of the wound roll. Both widthwise edges are preferably knurled.

Knurling may be given by pressing a heated embossing roll. The embossing roll has fine irregularities formed thereon, and pressing of which may form irregularities on the film, and may make the edge portions thereof bulky.

The cellulose acylate film used for the present invention preferably has a height of knurling on both widthwise edges of 4 to 20 μm, and a width of 5 to 20 mm.

In the present invention, the knurling is preferably given after the drying and before taking-up, in the filmmaking step.

(Haze)

The cellulose acylate film used for the present invention preferably has a haze of smaller than 1%, and more preferably smaller than 0.5%. By adjusting the haze smaller than 1%, the film will be more transparent and will be more convenient for use as an optical film.

(Average Moisture Content)

The cellulose acylate film used for the present invention preferably has an average moisture content at 25° C., 60% RH of 4% or below, and more preferably 3% or below. By adjusting the average moisture content to 4% or below, the film will be more durable to changes in moisture and will be less causative of changes in optical characteristics and dimension.

(Film Thickness)

The cellulose acylate film used for the present invention is preferably 30 to 100 μm thick. A thickness of 30 μm or larger is preferable in view of improving easiness of handling in the process of manufacturing of the web-formed film.

(Length and Width of Film)

The cellulose acylate film used for the present invention is preferably a long-sized web, preferably has a length of 100 to 10000 m or around, wound up into a roll. On the other hand, the cellulose acylate film used for the present invention preferably has a width of 1 m or wider, more preferably 1.4 m or wider, and particularly 1.4 to 4 m.

Considering now a method other than co-casting, the cellulose acylate film may be provided with an adhesion modifier layer by coating. In this case, a preferable thickness of the adhesion modifier layer is 0.1 to 10 nm.

The λ/4 plate of the present invention, in which cellulose acylate is used as a thermoplastic resin, may be manufactured in this way.

<Hard Coat Layer>

On the λ/4 plate of the present invention, the hard coat layer is provided. The hard coat layer is preferably either a clear hard coat layer or anti-glare hard coat layer.

The hard coat layer of the present invention is provided over the λ/4 plate, and preferably provided over the surface on the side where the adhesion modifier is more abundant.

In the present invention, it is more preferable to provide, over the hard coat layer, an antireflective layer which contains at least a low refractive layer, for the purpose of improving the visibility.

The hard coat layer of the present invention, when configured as a clear hard coat layer, preferably has a center line average roughness (Ra), specified by JIS B 0601, of 0.001 to 0.1 μm, and more preferably has an Ra of 0.002 to 0.05 μm. The center line average roughness (Ra) is preferably measured using an interferometric surface roughness analyzer, typically using a non-contact surface fine profiler WYKO NT-2000 from Wyko Corporation.

The hard coat layer of the present invention, when configured as of anti-glare type, has fine irregularities on the surface thereof, and the fine irregularities may be formed by mixing particles into the hard coat layer, and more specifically by mixing fine particles having an average particle size of 0.01 μm to 4 μm, which is described later, into the hard coat layer. Again as described later, surface roughness of the topmost layer of the antireflective layer provided over the anti-glare hard coat layer is preferably adjusted in the range from 0.08 μm to 0.5 μm, in terms of the center line average roughness (Ra) specified by JIS B 0601.

The particle contained in the hard coat layer used for the present invention is inorganic or organic particle.

Examples of the inorganic fine particle include those composed of silicon oxide, titanium oxide, aluminum oxide, tin oxide, zinc oxide, calcium carbonate, barium sulfate, talc, kaolin, calcium sulfate and so forth.

Examples of the organic fine particle include polymethacrylic acid methyl acrylate resin fine particle, acrylic styrene-based resin fine particle, polymethyl methacrylate resin fine particle, silicone-based resin fine particle, polystyrene-based resin fine particle, polycarbonate resin fine particle, benzoguanamine-based resin fine particle, melamine-based resin fine particle, polyolefinic resin fine particle, polyester-based resin fine particle, polyamide-based resin fine particle, polyimide-based resin fine particle, and polyfluorinated ethylene-based resin fine particle.

In the present invention, silicon oxide fine particle or polystyrene-based resin fine particle is particularly preferable.

The inorganic or organic fine particle described in the above is preferably used while adding it into a coating composition for forming the anti-glare hard coat layer which contains a resin and so forth.

In view of imparting anti-glare property to the hard coat layer of the present invention, content of the inorganic or organic particle is preferably 0.1 parts by mass to 30 parts by mass per 100 parts by mass of resin for forming the anti-glare hard coat layer, and more preferably 0.1 parts by mass to 20 parts by mass. In view of imparting a more preferable anti-glare effect, it is preferable to use 1 part by mass to 15 parts by mass per 100 parts by mass of resin for forming the anti-glare hard coat layer, of particle having an average particle size of 0.1 μm to 1 μm. It is also preferable to use two or more species of particles having different average particle sizes.

The hard coat layer of the present invention is also preferably mixed with an antistatic agent. The antistatic agent is preferably an electro-conductive material which contains at least one element selected from the group consisting of Sn, Ti, In, Al, Zn, Si, Mg, Ba, Mo, W and V, and has a volume resistivity of 107 Ω·cm or below.

The antistatic agent is exemplified by metal oxide, composite oxide and so forth containing the elements listed in the above.

Examples of the metal oxide include $ZnO$, $TiO_2$, $SnO_2$, $Al_2O_3$, $In_2O_3$, $SiO_2$, $MgO$, $BaO$, $MoO_2$, $V_2O_5$, and composite oxides of them, and $ZnO$, $In_2O_3$, $TiO_2$ and $SnO_2$ are particularly preferable. Effective examples containing different species of atoms include $ZnO$ added with Al, In and so forth, $TiO_2$ added with Nb, Ta and so forth, and $SnO_2$ added with Sb, Nb, halogen elements and so forth. Amount of addition of different species of atom is preferably 0.01 to 25 mol %, and particularly 0.1 to 15 mol %.

Volume resistivity of these electro-conductive metal oxide particles is $10^7$ Ω·cm or below, and particularly $10^5$ Ω·cm or below.

In view of ensuring sufficient levels of durability and impact resistance, the clear hard coat layer or anti-glare hard coat layer is preferably 0.5 μm to 15 μm thick, and more preferably 1.0 μm to 7 μm thick.

(Active Energy Beam Curable Resin)

The hard coat layer of the present invention preferably contains an active energy beam curable resin which is curable upon being irradiated by UV ray or active energy beam.

The active energy beam curable resin refers to a resin curable through a crosslinking reaction or the like, upon being irradiated by active energy beam such as UV ray, electron beam or the like. While the active energy beam curable resin is representatively exemplified by UV-curable resin, electron beam curable resin and so forth, it may alternatively be a resin curable by irradiation of active energy beam other than UV ray and electron beam.

Examples of the UV-curable resin include UV-curable acrylic urethane-based resin, UV-curable polyester acrylate-based resin, UV-curable epoxyacrylate-based resin, UV-curable polyol acrylate-based resin, and UV-curable epoxy resin.

The UV-curable acrylic urethane-based resin may readily be obtained, generally by allowing polyester polyol to react with isocyanate monomer or prepolymer, and to further react with an acrylate-based monomer having hydroxyl group, such as 2-hydroxyethyl acrylate, 2-hydroxyethyl methacrylate ("acrylate" hereinafter will be defined to include methacrylate, even if simply denoted as "acrylate"), and 2-hydroxypropyl acrylate. For example, a mixture of 100 parts of Unidic 17-806 (from DIC Corporation) and 1 part of Coronate L (from Nippon Polyurethane Industry Co. Ltd.), described in Japanese Laid-Open Patent Publication No. S59-151110, is preferably used.

The UV-curable polyester acrylate-based resin is readily obtained, generally by allowing a hydroxyl group or a carboxyl group at the terminal of polyester to react with a monomer such as 2-hydroxyethyl acrylate, glycidyl acrylate and acrylic acid (for example, see Japanese Laid-Open Patent Publication No. S59-151112).

The UV-curable epoxyacrylate-based resin is obtained by allowing a hydroxyl group at the terminal of epoxy resin to react with a monomer such as acrylic acid, acrylic acid chloride, and glycidyl acrylate.

UV-curable polyol acrylate-based resin is exemplified by ethylene glycol (meth)acrylate, polyethylene glycol di(meth)acrylate, glycerin tri(meth)acrylate, trimethylolpropane triacrylate, pentaerythritol triacrylate, pentaerythritol tetraacrylate, dipentaerythritol pentaacrylate, dipentaerythritol hexaacrylate, and alkyl-modified dipentaerythritol pentaacrylate.

Examples of epoxy-based active energy beam reactive compound, useful as the UV-curable epoxyacrylate-based resin and UV-curable epoxy resin, will be listed below.

(a) Glycidyl ether of bisphenol A (obtained as a mixture of compounds with different degrees of polymerization, by a reaction between epichlorohydrin and bisphenol A);

(b) a compound having a glycidyl ether group at the terminal thereof, obtained by allowing a compound having two phenolic OH groups, such as bisphenol A, to react with epichlorohydrin, ethylene oxide and/or propylene oxide;

(c) glycidyl ether of 4,4'-methylenebisphenol;

(d) an epoxy compound of phenol formaldehyde resin such as novolac resin or resol resin;

(e) a compound having alicyclic epoxide(s) such as
bis(3,4-epoxycyclohexylmethyl)oxalate,
bis(3,4-epoxycyclohexylmethyl)adipate,
bis(3,4-epoxy-6-cyclohexylmethyl)adipate,
bis(3,4-epoxycyclohexylmethyl)pimelate,
3,4-epoxy-cyclohexylmethyl-3,4-epoxycyclohexane carboxylate,
3,4-epoxy-1-methylcyclohexylmethyl-3',4'-epoxycyclohexane carboxylate,
3,4-epoxy-1-methyl-cyclohexylmethyl-3',4'-epoxy-1'-methyl cyclohexane carboxylate,
3,4-epoxy-6-methyl-cyclohexylmethyl-3',4'-epoxy-6'-methyl-1'-cyclohexane carboxylate, and
2-(3,4-epoxycyclohexyl-5',5'-spiro-3',4'-epoxy)cyclohexane-meta-dioxane;

(f) diglycidyl ether of dibasic acid, such as diglycidyl oxalate, diglycidyl adipate, diglycidyl tetrahydrophthalate, diglycidyl hexahydrophthalate, and diglycidyl phthalate;

(g) diglycidyl ether of glycol, such as ethylene glycol diglycidyl ether, diethylene glycol diglycidyl ether, propylene glycol diglycidyl ether, polyethylene glycol diglycidyl ether, polypropylene glycol diglycidyl ether, co-poly(ethylene glycol-propyleneglycol)diglycidyl ether, 1,4-butanediol diglycidyl ether, and 1,6-hexanediol diglycidyl ether;

(h) glycidyl ester of polymer acid, such as polyglycidyl ester of polyacrylic acid, and diglycidyl ester of polyester;

(i) glycidyl ether of polyhydric alcohol, such as glycerin triglycidyl ether, trimethylolpropane triglycidyl ether, pentaerythritol diglycidyl ether, pentaerythritol triglycidyl ether, pentaerythritol tetraglycidyl ether, and glucose triglycidyl ether;

(j) diglycidyl ether of 2-fluoroalkyl-1,2-diol similar to those exemplified as fluorine-containing epoxy compound which is a low-refractive-index, fluorine-containing resin; and (k) diol glycidyl ether having a fluorine-containing alkane terminal such as fluorine-containing epoxy compound of the fluorine-containing resin which is a low-refractive-index substance.

Molecular weight of the epoxy compound is 2000 or smaller in terms of average molecular weight and is preferably 1000 or smaller.

When the epoxy compound is cured by the active energy beam, it is effective to mix it with the compound (h) or (i) which is multifunctional epoxy group-containing compound in view of further increasing the hardness.

The photo-polymerization initiator or photo-sensitizer which is contributive to cationic polymerization of the epoxy-based active energy beam reactive compound is a compound capable of releasing a substance for initiating cationic polymerization upon being irradiated by active energy beam, and is particularly a series of double salts in the form of onium salt which releases, upon irradiation, a Lewis acid capable of initiating cationic polymerization.

The epoxy resin which is an active energy beam reactive compound polymerizes to form a crosslinked structure or a network structure by cationic polymerization, not by radical polymerization. This is a preferable active energy beam reactive resin since it is not affected by oxygen in the reaction system, unlike radical polymerization.

The epoxy resin which is an active energy beam reactive compound, useful for the present invention, polymerizes with the aid of the photo-polymerization initiator or photo-sensitizer which releases a cationic polymerization initiating substance when irradiated by active energy beam. Particularly preferable examples of the photo-polymerization initiator include a series of double salts in the form of onium salt which releases, upon irradiation, a Lewis acid capable of initiating cationic polymerization.

Representative compounds are those represented by the general formula (a) below.

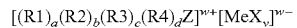  General Formula (a):

$[(R1)_a(R2)_b(R3)_c(R4)_dZ]^{w+}[MeX_v]^{w-}$

In the formula, cation is an onium, Z represents S, Se, Te, P, As, Sb, Bi, O, halogen (for example, I, Br, Cl), or N=N (diazo), and R1, R2, R3, R4 are organic groups which may be the same or different. Each of a, b, c and d is an integer of 0 to 3, where a+b+c+d equals to a valence of Z. Me represents a metal or a semimetal (metalloid) which serves as a center atom of a halide complex, such as B, P, As, Sb, Fe, Sn, Bi, Al, Ca, In, Ti, Zn, Sc, V, Cr, Mn, and Co. X represents a halogen atom, w represents a net electric charge of the halide complex ion and v represents the number of halogen atoms in the halide complex ion.

Specific examples of the anion $[MeX_v]^{w-}$ in the general formula (a) include tetrafluoroborate ($BF_4^-$), tetrafluorophosphate ($PF_4^-$), tetrafluoroantimonate ($SbF_4^-$), tetrafluoroarsenate ($AsF_4^-$) and tetrachloroantimonate ($SbCl_4^-$).

Other examples of the anion include perchlorate ion ($ClO_4^-$), trifluoromethylsulfite ion ($CF_3SO_3^-$), fluorosulfonate ion ($FSO_3^-$), toluenesulfonate ion and trinitrobenzene acid anion.

Among these onium salts, it is particularly preferable to use an aromatic onium salt as the cationic polymerization initiator, and preferable examples include aromatic halonium salts described in Japanese Laid-Open Patent Publication No. S50-151996 and ibid. No. S50-158680; Group VIa element-containing aromatic onium salts described in Japanese Laid-Open Patent Publication No. S50-151997, ibid. No. S52-30899, ibid. No. S59-55420, and ibid. No. S55-125105; oxosulfonium salts described in Japanese Laid-Open Patent Publication No. S56-8428, ibid. No. S56-149402, and ibid. No. S57-192429; aromatic diazonium salt described in Examined Japanese Patent Publication No. S49-17040; and thiopyrylium salt described in U.S. Pat. No. 4,139,655. Other examples include polymerization initiator containing aluminum complex or photo-degradable silicon compound. The cationic polymerization initiator may be used in combination with a photo-sensitizer such as benzophenone, benzoin isopropyl ether, and thioxanthone.

For the case where the active energy beam reactive compound having epoxyacrylate group is used, photo-sensitizers such as n-butylamine, triethylamine and tri-n-butylphosphine may be used. An amount of use of 0.1 to 15 parts by mass, per 100 parts by mass of UV-reactive compound, of the photo-sensitizer or photo-polymerization initiator, used as the active energy beam-reactive compound, is sufficient to initiate the photo-reaction. The amount of use is preferably 1 to 10 parts by mass. The sensitizer preferably has an absorption maximum in the near-UV region to the visible region.

For the active energy beam curable resin composition useful for the present invention, the amount of use of the polymerization initiator is preferably 0.1 to 15 parts by mass per 100 parts by mass of active energy beam curable epoxy resin (prepolymer) in general and more preferably 1 to 10 parts by mass.

The epoxy resin may be used together with the urethane acrylate-type resin, polyether acrylate-type resin or the like. In this case, it is preferable to combine an active energy beam assisted polymerization initiator and an active energy beam assisted cationic polymerization initiator.

For the hard coat layer of the present invention, also oxetane compound may be used. The oxetane compound usable herein is an oxetane ring-containing compound characterized by a three-membered ring containing oxygen or sulfur. Among them, the compound having an oxygen-containing oxetane ring is preferable. The oxetane ring may be substituted by halogen atom, haloalkyl group, arylalkyl group, alkoxyl group, allyloxy group, or acetoxy group. Specific examples thereof include 3,3-bis(chloromethyl)oxetane, 3,3-bis(iodomethyl)oxetane, 3,3-bis(methoxymethyl)oxetane, 3,3-bis(phenoxymethyl)oxetane, 3-methyl-3-chloromethyloxetane, 3,3-bis(acetoxy methyl)oxetane, 3,3-bis(fluoromethyl)oxetane, 3,3-bis(bromomethyl)oxetane, and 3,3-dimethyloxetane. In the present invention, the oxetane compound may be any of monomer, oligomer, and polymer.

In the hard coat layer of the present invention, any of publicly known binder composed of thermoplastic resin, thermosetting resin, or hydrophilic resin such as gelatin may be used by mixing it into the above-described active energy beam curable resin. These resins preferably have a polar group in the molecules thereof. The polar group is exemplified by —COOM, —OH, —NR$_2$, —NR$_3$X, —SO$_3$M, —OSO$_3$M, —PO$_3$M$_2$, and —OPO$_3$M (where, M represents a hydrogen atom, alkali metal or ammonium group, X represents an acid capable of forming an amine salt, and R represents a hydrogen atom or alkyl group).

For the case where the hard coat layer of the present invention contains the active energy beam curable resin, the active energy beam may be irradiated after the hard coat layer and the antireflective layer (middle-to-high refractive layer and low refractive layer) were coated on the support. However, it is preferable to irradiate the active energy beam when the hard coat layer is formed by coating.

The active energy beam used for the present invention is arbitrarily selectable from energy sources such as UV ray, electron beam, and γ ray, without special limitation so long as it can activate the compound and UV ray and electron beam are preferable, and UV ray is particularly preferable from the viewpoints of readiness of handling and readiness of obtaining high energy. Light source of UV for polymerizing the UV reactive compound is arbitrarily selectable from those capable of emitting UV ray. Examples include low-pressure mercury lamp, medium-pressure mercury lamp, high-pressure mercury lamp, ultrahigh-pressure mercury lamp, carbon arc lamp, metal halide lamp, and xenon lamp. Also ArF excimer laser, KrF excimer laser, excimer lamp or synchrotron radiation is usable. The light source used herein preferably shows an emission spectrum in the UV region from 250 nm to 420 nm. Conditions of irradiation will vary depending on types of the lamps, wherein irradiation dose is preferably 20 mJ/cm$^2$ or larger, more preferably from 50 mJ/cm$^2$ to 2000 mJ/cm$^2$, and particularly 50 mJ/cm$^2$ to 1000 mJ/cm$^2$.

UV may be irradiated onto the hard coat layer and a plurality of layers composing the antireflective layer described later (medium refractive layer, high refractive layer, low refractive layer) every time a single layer is formed, or may be irradiated after the layers are stacked. Alternatively, both modes of irradiation may be combined. From the viewpoint of productivity, UV is preferably irradiated after the layers are stacked.

Also electron beam may be used in a similar manner. The electron beam is exemplified by those emitted from various types of electron accelerator such as Cockcroft-Walton type, Van de Graaff type, resonant transformer type, insulated-core transformer type, linear type, dynamitron type, and radio frequency type accelerators, with an energy of 50 to 1000 keV, and preferably 100 to 300 keV.

The active energy beam-reactive compound used for the present invention would initiate photo polymerization or photo-crosslinking alone by itself, but may suffer from a long induction period of polymerization or delayed initiation of polymerization. It is therefore preferable to use the photo-sensitizer or photo-polymerization initiator so as to accelerate the polymerization.

For the case where the hard coat layer of the present invention contains the active energy beam curable resin, the active energy beam may be irradiated in the presence of the photo-polymerization initiator or photo-sensitizer.

Specific examples thereof include acetophenone, benzophenone, hydroxybenzophenone, Michler's ketone, α-amyloxime ester, thioxanthone and derivatives of them. For the case where a photo-reactive agent is used for synthesis of the epoxyacrylate-based resin, a sensitizer such as n-butylamine, triethylamine, and tri-n-butylphosphine may be used. Content of the photo-reaction initiator and/or photo-sensitizer contained in the UV-curable resin composition, excluding the solvent component which vaporizes off in the process of drying after being coated, is preferably 1% by mass to 10% by mass of the composition, and particularly 2.5% by mass to 6% by mass.

For the case where the UV-curable resin is used as the active energy beam curable resin, a UV absorber described later may be added to the UV-curable resin composition to the extent not inhibiting photo-curing of the UV-curable resin.

An antioxidant which will not suppress the photo-curing reaction may be selected and used for the purpose of improving heat resistance of the hard coat layer. The antioxidant is exemplified by hindered phenol derivative, thiopropionic acid derivative, and phosphite derivative. More specifically, the examples include
4,4'-thiobis(6-tert-3-methylphenol),
4,4'-butylidene-bis(6-tert-butyl-3-methylphenol),
1,3,5-tris(3,5-di-tert-butyl-4-hydroxybenzyl)isocyanurate,
2,4,6-tris(3,5-di-tert-butyl-4-hydroxybenzyl)mesitylene,
and di-octadecyl-4-hydroxy-3,5-di-tert-butylbenzyl phosphate.

The UV-curable resin is arbitrarily selectable from Adeca Optomer KR- and BY-Serieses including KR-400, KR-410, KR-550, KR-566, KR-567, and BY-320B (all from ADEKA Corporation); Koeihard A-101-KK, A-101-WS, C-302, C-401-N, C-501, M-101, M-102, T-102, D-102, NS-101, FT-102Q8, MAG-1-P20, AG-106, M-101-C (all from Koei Chemical Co. Ltd.); Seikabeam PHC2210(S), PHCX-9(K-3), PHC2213, DP-10, DP-20, DP-30, P1000, P1100, P1200, P1300, P1400, P1500, P1600, SCR900 (all from Dainichiseika Color & Chemicals Mfg. Co. Ltd.); KRM7033, KRM7039, KRM7130, KRM7131, UVECRYL29201, UVECRYL29202 (all from Daicel-UCB Co. Ltd.); RC-5015, RC-5016, RC-5020, RC-5031, RC-5100, RC-5102, RC-5120, RC-5122, RC-5152, RC-5171, RC-5180, RC-5181 (all from DIC Corporation); Aurex No. 340 Clear (from Chugoku Marine Paints, Ltd.); Sanrad H-601 (from Sanyo Chemical Industries, Ltd.); SP-1509, SP-1507 (both from Showa Highpolymer Co. Ltd.); RCC-15C (from Grace Japan Co. Ltd.); Aronix M-6100, M-8030, M-8060 (all from Toagosei Co. Ltd.), and other commercially available products.

Coating composition which contains the active energy beam curable resin preferably has a solid content of 10% by mass to 95% by mass, which is appropriately selected depending on method of coating.

The hard coat layer of the present invention also preferably contains a surfactant. The surfactant is preferably a silicone-based or fluorine-containing surfactant.

The silicone-based surfactant is preferably a nonionic surfactant having the hydrophobic group thereof configured by dimethylpolysiloxane and the hydrophilic group thereof configured by polyoxyalkylene.

The nonionic surfactant is a general term for a surfactant having no group capable of dissociating in aqueous solution to produce ion, and has not only a hydrophobic group, but also a hydrophilic group such as hydroxyl groups of polyhydric alcohol, and polyoxyalkylene chain (polyoxyethylene). Hydrophilicity becomes stronger as the number of alcoholic hydroxyl groups increases, and also as the polyoxyalkylene chain (polyoxyethylene chain) becomes longer. The nonionic surfactant of the present invention characteristically has dimethylpolysiloxane as the hydrophobic group.

By using the nonionic surfactant having dimethylpolysiloxane as the hydrophobic group and having polyoxyalkylene as the hydrophilic group, the anti-glare hard coat layer and the low refractive layer may be reduced in non-uniformity and improved in anti-fouling property of the surface. The hydrophobic group composed of polymethylsiloxane is supposed to align on the surface, to thereby make the surface less likely to be fouled. This is an effect not attainable by other types of surfactant.

Specific examples of the nonionic surfactant include silicone-based surfactant SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166, and FZ-2191, all available from Nippon Unicar Co. Ltd.

Also exemplified are SUPERSILWET SS-2801, SS-2802, SS-2803, SS-2804, and SS-2805.

The nonionic surfactant, having the hydrophobic group configured by dimethylpolysiloxane and having the hydrophilic group configured by polyoxyalkylene, preferably has a structure of straight chain-like block copolymer in which structural portions of dimethylpolysiloxane and polyoxyalkylene chains are alternately combined. The excellence is ascribable to its long principal chain and the straight chain-like structure. This is supposedly because, by virtue of the structure of block copolymer having the hydrophilic groups and the hydrophobic groups alternately combined therein, a single molecule of surfactant can adsorb onto a silica particle at a plurality of sites so as to cover the particle.

Specific examples thereof include silicone surfactant ABN SILWET FZ-2203, FZ-2207, and FZ-2208, all available from Nippon Unicar Co. Ltd.

The fluorine-containing surfactant used herein may be a surfactant in which the hydrophobic group has a perfluorocarbon chain. Examples thereof include fluoroalkylcarboxylic acid, disodium N-perfluorooctanesulfonyl glutamate, sodium 3-(fluoroalkyloxy)-1-alkylsulfonate, sodium 3-(ω-fluoroalkanoyl-N-ethylamino)-1-propanesulfonate, N-(3-perfluorooctanesulfonamide)propyl-N,N-dimethyl-N-carboxymethylene ammonium betaine, perfluoroalkylcarboxylic acid, perfluorooctanesulfonic acid diethanolamide, perfluoroalkyl sulfonic acid salt, N-propyl-N-(2-hydroxyethyl) perfluorooctane sulfonamide, perfluoroalkyl sulfonamide propyltrimethylammonium salt, perfluoroalkyl-N-ethylsulfonylglycine salt, and bis(N-perfluorooctylsulfonyl-N-ethylaminoethyl) phosphate. Nonionic surfactant is preferable for the present invention.

These fluorine-containing surfactants are commercially available under the trade names of Megafac, Eftop, Surflon, Ftergent, Unidyne, Florard, Zonyl and so forth.

Amount of addition of the nonionic surfactant is preferably 0.01 to 3.0% on the basis of solid content contained in coating liquid for forming the hard coat layer, and is more preferably 0.02 to 1.0%.

Also other types of surfactant may be used in combination, typically with an anionic surfactant such as a sulfonate type, sulfate ester salt type, or phosphate ester salt type; or a nonionic surfactant of an ether type or ether ester type having a polyoxyethylene chain as the hydrophilic group.

A solvent used in the process of forming by coating the hard coat layer of the present invention is arbitrarily selectable from hydrocarbons, alcohols, ketones, esters, glycol ethers and so forth, in an independent or mixed manner. It is preferable to use a solvent containing propylene glycol mono $(C_{1-4})$alkyl ether or propylene glycol mono$(C_{1-4})$alkyl ether ester, the content of which is 5% by mass or more, and more preferably 5% by mass to 80% by mass.

A coating liquid containing the hard coat layer composition may be coated using any of publicly known methods such as a gravure coater, spin coater, wire bar coater, roll coater, reverse coater, extrusion coater or air doctor coater, spray coating and ink jet process. An amount of coating is appropriately 5 μm to 30 μm on the basis of thickness of wet film, and preferably 10 μm to 20 μm. A coating speed is preferably 10 m/min to 200 m/min.

The hard coat layer composition is preferably irradiated by the active energy beam such as UV ray or electron beam so as to be cured after being coated and dried. Irradiation time of the active energy beam is preferably 0.5 seconds to 5 minutes, and more preferably 3 seconds to 2 minutes, taking curing efficiency of the UV-curable resin and efficiency of working into account.

(Antireflective Layer)

On the hard coat layer of the λ/4 plate of the present invention, also provision of an antireflective layer is preferable in view of improving the visibility.

The antireflective layer used herein may have a single layered structure composed of a low refractive layer only, or may preferably have a plurality of refractive layers. On the λ/4 plate having the hard coat layer formed thereon, the plurality of antireflective layers may be stacked, while considering refractive index, thickness, the number of layers, order of layers and so forth, so that the reflectance may be reduced by optical interference. The antireflective layer is composed of high refractive layer(s) having a refractive index larger than that of the support, and low refractive layer(s) having a refractive index smaller than that of the support, and in particular preferably composed of three or more refractive layers in which a preferable configuration is such as composed of three layers having different refractive indices stacked in the order, from the support side, of medium refractive layer (a layer having a refractive index larger than that of the support or anti-glare hard coat layer, and smaller than that of the high refractive layer)/high refractive layer/low refractive layer.

Alternatively, also a reflective layer having a four or more layered configuration, in which two or more high refractive layers and two or more low refractive layers are alternately stacked, is preferably used.

Preferable examples of the layer configuration of the antireflective layer of the present invention will be listed below, wherein "/" indicates placement by stacking.

(λ/4 Plate)/clear hard coat layer/low refractive layer;
(λ/4 plate)/clear hard coat layer/high refractive layer/low refractive layer;
(λ/4 plate)/clear hard coat layer/medium refractive layer/high refractive layer/low refractive layer;

(λ/4 plate)/anti-glare hard coat layer/low refractive layer;
(λ/4 plate)/anti-glare hard coat layer/high refractive layer/low refractive layer; and
(λ/4 plate)/anti-glare hard coat layer/medium refractive layer/high refractive layer/low refractive layer.

For easy removal by wiping of dirt or fingerprint, an anti-fouling layer may additionally be provided over the topmost low refractive layer. A fluorine-containing organic compound is preferably used for the anti-fouling layer.

The layer configuration of the antireflective layer is not specifically limited to those listed in the above so long as it may reduce the reflectance by optical interference. The layer configuration listed in the above may optionally have an intermediate layer, for which an antistatic layer containing an electro-conductive polymer particle (for example, crosslinked cationic particle) or metal oxide fine particle ($SnO_2$, ITO, etc.) is preferable.

The low refractive layer, the medium refractive layer, and the high refractive layer may be formed according to the publicly known configurations. In particular, for the low refractive layer, hollow spherical silica-based fine particle is preferably used, and (I) composite particle composed of porous particle and a cover layer provided on the surface thereof, or (II) hollow particle having internal voids filled with solvent, gas or porous substance, may be used.

The low refractive layer, the medium refractive layer, and the high refractive layer are detailed in Japanese Laid-Open Patent Publication No. 2005-266051.

Thickness of the individual refractive layers composing the antireflective layer is preferably 1 nm to 200 nm and more preferably 5 nm to 150 nm, and the thickness is preferably selected depending on the refractive indices of the individual layers.

The antireflective layer used for the present invention preferably has an average reflectance at 450 nm to 650 nm of 1% or smaller and more preferably 0.5% or smaller. Minimum reflectance in this range is preferably 0.00 to 0.3%.

The refractive index and the thickness of the antireflective layer may be determined by measuring spectral reflectance. Reflective characteristics of the thus-manufactured low reflection film may be obtained by measuring reflectance at a regular reflection angle of 5° using a spectrophotometer.

EXAMPLES

The present invention will now be specifically explained below referring to Examples without limiting the present invention.

(Synthesis of Cellulose Acylate)

Cellulose acylates having values of the degree of acetyl substitution listed in Tables 1 and 2 were synthesized according to the methods described in Japanese Laid-Open Patent Publication No. H10-45804 and ibid. No. H08-231761, and the degree of substituted was measured. More specifically, cellulose was added with sulfuric acid as a catalyst (7.8 parts by mass per 100 parts by mass of cellulose), and also added with carboxylic acid as a source of acyl substituent, and an acylation reaction was allowed to proceed at 40° C. In this process, the degree of substitution was adjusted by controlling types and amount of the carboxylic acid. The acylation was followed by aging at 40° C. A low molecular weight fraction in the cellulose acylate was removed by washing with acetone.

The degree of substitution was determined in accordance with ASTM-D817-96.

The cellulose acylate denoted as "CAP" in Tables 1 and 2 is cellulose acetate propionate (degree of acetyl substitution=1.90, degree of propionyl substitution=0.54).

(Adhesion Modifier)

Benzotriazole-based compounds (A-1 to A-3), triazine-based compounds (A-4, A-5), and a benzophenone-based compound used in Examples are the compounds listed below.
A-1: Tinuvin 928 (λmax=348 nm: from BASF Japan Ltd.)
A-2: Tinuvin 326 (λmax=353 nm: from BASF Japan Ltd.)
A-3: Tinuvin 517 (λmax=344 nm: from BASF Japan Ltd.)
A-4: Tinuvin 1577FF (λmax=274 nm: from BASF Japan Ltd.)
A-5: UV-1164 (λmax=350 nm: from Cytec Industries, Inc.)
A-6: CHIMASSORB 81 (λmax=327 nm: from BASF Japan Ltd.)

Absorption peak (λmax) was measured by dissolving each of the compounds into a solvent (dichloromethane or toluene), and by using a spectrophotometer UVIDFC-610 from Shimadzu Corporation. All compounds were found to have the absorption peak (λmax) within the range from 260 nm to 400 nm.

<Manufacturing of λ/4 Plates 101 to 108>

The dope described below was prepared, and a λ/4 plate 101 composed of a cellulose acylate film was manufactured.

<Particle Dispersion 1>

| | |
|---|---|
| Fine particle (Aerosil R812, from Nippon Aerosil Co. Ltd.) | 11 parts by mass |
| Ethanol | 89 parts by mass |

These components were mixed in a dissolver for 50 minutes and then dispersed in a Manton-Gaulin homogenizer.

<Particle Addition Liquid 1>

In a dissolution tank containing methylene chloride, the particle dispersion 1 was slowly added under thorough stirring. The mixture was further dispersed in an attritor so as to adjust the secondary particle size to a predetermined value. The product was filtered through Fine Met NF from Nippon Seisen Co. Ltd., to thereby prepare a particle added liquid 1.

| | |
|---|---|
| Methylene chloride | 99 parts by mass |
| Particle dispersion 1 | 5 parts by mass |

A main dope liquid having the composition shown below was prepared. In a pressurized dissolution tank, methylene chloride and ethanol was placed. Into the pressurized dissolution tank containing the solvents, cellulose acetate having a degree of acetyl substitution of 2.75 was added under stirring. The mixture was heated under stirring for thorough dissolution. The resultant solution was filtered through Azumi filter paper No. 244 from Azumi Filter Paper Co. Ltd., to thereby prepare the main dope liquid.

<Composition of Main Dope Liquid>

| | |
|---|---|
| Methylene chloride | 340 parts by mass |
| Ethanol | 64 parts by mass |
| Cellulose acetate (degree of acetyl substitution = 2.75) | 100 parts by mass |
| Discotic compound A shown below | 5 parts by mass |
| Rod-like compound B shown below | 10 parts by mass |
| Adhesion modifier: A-1 | 0.1 parts by mass |
| Particle added liquid 1 | 1 part by mass |

[Chemical Formula 16]

Compound A

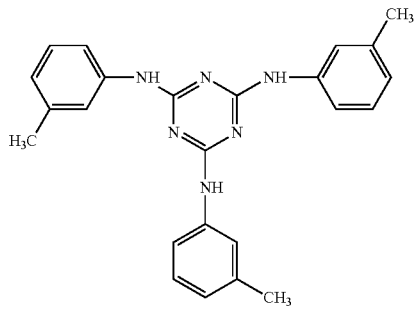 [SMILES: Cc1cccc(Nc2nc(Nc3cccc(C)c3)nc(Nc3cccc(C)c3)n2)c1]

Compound B

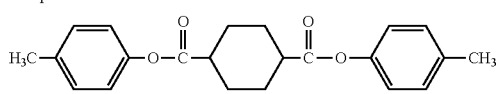

The components were placed in an airtight main dissolution vessel 1, and the contents were dissolved under stirring to thereby prepare a dope liquid. Next, using an endless belt casting apparatus, the dope liquid at 33° C. was uniformly cast in a width of 2000 mm on a stainless steel belt support. Temperature of the stainless steel belt was controlled at 30° C.

On the stainless steel belt support, the solvent was allowed to vaporize until the content of the residual solvent in the cast film decreased down to 75%, and the film was then separated from the stainless steel belt support at a tensile force of separation of 130 N/m.

The separated cellulose acetate film was conveyed while being stretched in the direction parallel to the direction of casting, in the state that a portion (roll) where the tensile force at the point of separation is cut and a portion (roll) where the tensile force is applied next are given at different speeds. In the stretching, stretching ratio and stretching speed were appropriately adjusted so as to attain values of in-plane phase difference Ro listed in Table 1. The film was further dried in a drying zone while being conveyed by a large number of rolls to complete the drying.

Next, the film was obliquely stretched using an apparatus described in Japanese Laid-Open Patent Publication No. 2009-214441 (Example 1, stretching machine A: FIG. 11), at 170° C., and at a stretching ratio of 1.5, so as to align the phase retardation axis in the direction 45° away from the longitudinal direction of the film.

Next, the film was dried in the drying zone while being conveyed by a large number of rolls to complete the drying. The drying temperature was adjusted to 130° C. and tensile force of conveyance was adjusted to 100 N/m.

In this way, the λ/4 plate 101 having a dry thickness of 80 μm was obtained.

Next, λ/4 plates 102 to 108 were manufactured in the same way, except that the amounts of addition of cellulose acylate and adhesion modifier and thickness of the film were adjusted as listed in Table 1.

<Manufacturing of λ/4 Plates 109 to 122>

Three types of dope shown below were prepared and a λ/4 plate 109, which is a stacked cellulose acylate film having a core and skin portions, was manufactured by co-casting.

(Preparation of Cellulose Acylate Dope for Forming Core Layer)

| | |
|---|---|
| Methylene chloride | 340 parts by mass |
| Ethanol | 64 parts by mass |
| Cellulose acetate (degree of acetyl substitution = 2.82) | 100 parts by mass |
| Triphenylene phosphate | 20 parts by mass |

(Preparation of Cellulose Acylate Dope for Forming Skin Layer on Hard Coat Layer Side)

| | |
|---|---|
| Methylene chloride | 340 parts by mass |
| Ethanol | 64 parts by mass |
| Cellulose acetate (degree of acetyl substitution = 2.88) | 100 parts by mass |
| Discotic compound A shown above | 5 parts by mass |
| Rod-like compound B shown above | 10 parts by mass |
| Adhesion modifier: A-1 | 0.005 parts by mass |
| Particle addition liquid 1 | 1 part by mass |

(Preparation of Cellulose Acylate Dope for Forming Skin Layer)

| | |
|---|---|
| Methylene chloride | 340 parts by mass |
| Ethanol | 64 parts by mass |
| Cellulose acetate (degree of acetyl substitution = 2.88) | 100 parts by mass |
| Triphenylene phosphate | 20 parts by mass |
| Particle addition liquid 1 | 1 part by mass |

Each of the compositions listed in the above was placed in a mixing tank, stirred to thereby dissolve the individual components and the product was filtered through a filter paper with an average pore size of 34 μm and a sintered metal filter with an average pore size of 10 μm to thereby prepare each cellulose acylate dope. Using a band casting machine, the individual dopes were co-cast through the die illustrated in FIG. 2 so as to form a three-layered structure of (skin layer on hard coat layer side)/core layer/skin layer. In this process, simultaneous multi-layer casting was carried out while adjusting amounts of casting of the individual dopes so as to attain a final thickness of the film, after being stretched, of 5 μm/80 μm/5 μm, where the core layer became thickest. The film separated from the band, at a content of residual solvent of approximately 30% by mass, was stretched widthwise using a tenter by a stretching ratio of 32%, while being blown with a hot air of 140° C., and then relaxed at 140° C. for 60 seconds so as to adjust the stretching ratio to 30%. After that a mode of conveyance of the film was changed from tenter conveyance to roll conveyance and the film was further dried at 120° C. to 150° C., and then taken up.

The film was then obliquely stretched using an apparatus described in Japanese Laid-Open Patent Publication No. 2009-214441 (Example 1, stretching machine A: FIG. 11) at 170° C. and at a stretching ratio of 1.5 so as to align the phase retardation axis in the direction 45° away from the longitudinal direction of the film.

Next, the film was dried in the drying zone while being conveyed by a large number of rolls to complete the drying. The drying temperature was adjusted to 130° C. and the tensile force of conveyance was adjusted to 100 N/m.

In this way, the λ/4 plate 109 having a dry thickness of 90 µm was obtained.

Next, λ/4 plates 110 to 122, which are stacked cellulose acylate films, were manufactured in the same way except that types and amounts of addition of cellulose acylate and adhesion modifier and thickness of the film were altered as listed in Table 1.

<Manufacturing of λ/4 Plate 123>
(Manufacturing of Alicyclic Polyolefin Resin Film)

A norbornene resin film having a target dry thickness of 87 µm was manufactured using a melt-casting film forming machine.

| Norbornene resin (Zeonor 1420, from ZEON Corporation) | 100 parts by mass |
|---|---|
| Adhesion modifier: A-1 | 0.1 parts by mass |

A mixture of the materials listed above was melted and mixed using a twin-screw extruder at 250° C., filtered through Fine Met NF from Nippon Seisen Co. Ltd. (nominal filter rating=15 µm) and then pelletized. Using the pellet, the melt was filtered for the second time through Fine Met NF from Nippon Seisen Co. Ltd. (nominal filter rating=20 µm), and then extruded at a melting temperature of 250° C. in the same way through the T-die into a sheet form over a cooling drum at 30° C., followed by solidification by cooling to thereby obtain the norbornene resin sheet.

The thus-obtained resin sheet was obliquely stretched using an apparatus described in Japanese Laid-Open Patent Publication No. 2009-214441 (Example 1, stretching machine A: FIG. 11) at 170° C. and at a stretching ratio of 1.5 so as to align the phase retardation axis in the direction 45° away from the longitudinal direction of the film. A λ/4 plate 123 which is an alicyclic polyolefin resin film was thus manufactured.

<Manufacturing of λ/4 Plate 124>
(Manufacturing of Stacked Alicyclic Polyolefin Resin Film)
(Material for Core Layer)

| Norbornene resin (Zeonor 1420, from ZEON Corporation) | 100 parts by mass |
|---|---|

(Material for Skin Layer on Hard Coat Layer Side)

| Norbornene resin (Zeonor 1420, from ZEON Corporation) | 100 parts by mass |
|---|---|
| Adhesion modifier: A-1 | 0.1 parts by mass |

(Material for Skin Layer)

| Norbornene resin (Zeonor 1420, from ZEON Corporation) | 100 parts by mass |
|---|---|

A mixture of the materials listed above was melted and mixed using a twin-screw extruder at 250° C., filtered through Fine Met NF from Nippon Seisen Co. Ltd. (nominal filter rating=15 µm) and then pelletized. Using the pellet, the melt was filtered for the second time through Fine Met NF from Nippon Seisen Co. Ltd. (nominal filter rating=20 µm) and then extruded at a melting temperature of 250° C. in the same way through the die illustrated in FIG. 2 into a stacked sheet form over a cooling drum at 30° C., followed by solidification by cooling to thereby obtain a stacked norbornene resin sheet.

The thus-obtained resin sheet was obliquely stretched using an apparatus described in Japanese Laid-Open Patent Publication No. 2009-214441 (Example 1, stretching machine A: FIG. 11) at 170° C. and at a stretching ratio of 1.5 so as to align the phase retardation axis in the direction 45° away from the longitudinal direction of the film. A λ/4 plate 124 which is an alicyclic polyolefin resin film was thus manufactured.

<Manufacturing of Comparative λ/4 Plates 125 to 140>

Comparative λ/4 plates 125 to 132 were manufactured in the same way with the λ/4 plate 101, except that types of cellulose acylate, amount of addition of the adhesion modifier, and thickness were altered as listed in Table 2.

Comparative λ/4 plates 133 to 140 were manufactured in the same way with the λ/4 plate 109 except that types of cellulose acylate, amount of addition of the adhesion modifier, and thickness were altered as listed in Table 2.

<Manufacturing of λ/4 Plates with Hard Coats 101 to 140>

On each of the thus-manufactured λ/4 plates, a coating liquid 1 for hard coat layer was coated by die-coating, and after drying the coating at 80° C., it was irradiated by UV-ray at 120 mJ/cm² using a high-pressure mercury lamp to thereby form a clear hard coat layer with a thickness after curing of 6 µm.

(Coating Liquid 1 for Hard Coat Layer)

| Acetone | 45 parts by mass |
|---|---|
| Ethyl acetate | 45 parts by mass |
| Propylene glycol monomethyl ether | 10 parts by mass |
| Pentaerythritol triacrylate | 30 parts by mass |
| Pentaerythritol tetraacrylate | 45 parts by mass |
| Urethane acrylate (trade name U-4HA, from Shin-Nakamura Chemical Co. Ltd.) | 25 parts by mass |
| 1-Hydroxycyclohexyl phenyl ketone (Irgacure 184, from BASF Japan Ltd.) | 5 parts by mass |
| 2-Methyl-1-[4-(methylthio)phenyl]-2-morpholino-1-one (Irgacure 907, from BASF Japan Ltd.) | 3 parts by mass |
| BYK-331 (silicone surfactant, from BYK Japan K.K.) | 0.5 parts by mass |

<Manufacturing of λ/4 Plate with Hard Coat 141>

On the surface of the λ/4 plate 130, a coating liquid for underlining layer 1 described below was coated so as to attain a dry thickness of approximately 0.2 µm and dried in a drying zone conditioned at 80° C. to thereby form an underlining layer.

Next, a hard coat layer was provided in the same way using the coating liquid 1 for hard coat layer to thereby manufacture the λ/4 plate with hard coat 141.

(Coating Liquid for Underlining Layer 1)

| Polymethyl methacrylate (weight average molecular weight = 30,000) | 0.5 parts by mass |
|---|---|
| Propyleneglycol monomethyl ether | 70 parts by mass |
| Methyl ethyl ketone | 30 parts by mass |

<Manufacturing of Liquid Crystal Display Devices with Front Panels 101 to 142>

From BRAVIA LX900, a 3D compatible 60-inch display manufactured by Sony Corporation, an original front plate was removed and also a filler having been filled between a polarizing plate on the front surface of a panel and the front plate was removed. A new sealing layer was formed by coating SVR1100 from Sony Chemical and Information Corporation, which contains a UV-curable resin, to a thickness of 100 μm, and a glass plate preliminarily bonded with the λ/4 plate with hard coat 101 manufactured as explained above was put thereon while placing an acrylic resin-based tacky agent in between. And UV-ray was irradiated from the topmost hard coat layer side with an irradiation dose of 5000 mJ/cm² to thereby cure the sealing layer. A liquid crystal display device with front plate 101 configured as illustrated in FIG. 1 was thus manufactured.

Using λ/4 plates with hard coats 102 to 141, liquid crystal display devices with front plates 102 to 141 configured as illustrated in FIG. 1 were manufactured in the same way.

In addition, a polyethylene terephthalate film (PET film) was manufactured referring to the description of Japanese Laid-Open Patent Publication No. 2009-169393.

A liquid crystal display device with front plate 142 was manufactured using the polyethylene terephthalate film (PET film) in the similar way with the hard coat film 101.

(3D Glasses)

The λ/4 plate with hard coat 101 was bonded to a panel side of 3D glasses TDG-BR100 from Sony Corporation.

<<Evaluation>>

<Measurement of Phase Difference Values Ro, Rt>

Average refractive index of samples of the λ/4 plate manufactured in the above was measured using an Abbe's refractometer and a spectral light source. Thickness of the film was measured using a commercially available micrometer.

Retardation of the film having been allowed to stand at 23° C., 55% RH for 24 hours was measured in the same environment, at 590 nm using an automatic birefringence analyzer KOBRA-21ADH (from Oji Scientific Instruments). The average refractive index and the thickness of the film determined in the above were input into the equations below, to determine in-plane phase difference Ro, and thickness-wise phase difference Rt.

$$Ro=(nx-ny) \times d \qquad \text{Equation (i):}$$

$$Rt=\{(nx+ny)/2-nz\} \times d \qquad \text{Equation (ii):}$$

(In the formula, nx represents maximum in-plane refractive index of the film (also referred to as refractive index in the direction of phase retardation axis), ny represents in-plane refractive index of the film in the direction orthogonal to the phase retardation axis, nz represents refractive index of the film in the thickness-wise direction, all being values at 23° C., 55% RH and 590 nm and d represents thickness (nm) of the film.)<

<Transmissivity of Light>

Transmissivity of light at 380 nm of the λ/4 plates manufactured in the above was measured using a spectrophotometer UVIDFC-610 from Shimadzu Corporation.

⊚: Transmissivity of light at 380 nm is 50% or larger;

○: transmissivity of light at 380 nm is 30% or larger, and smaller than 50%;

Δ: transmissivity of light at 380 nm is 10% or larger, and smaller than 30%; and x: transmissivity of light at 380 nm is smaller than 10%.

<Adherence between Hard Coat Layer and Cellulose Acylate Film>

The liquid crystal display devices with front plates manufactured in the above were conditioned at 23° C., 55% RH for 24 hours, and adherence of the hard coat layer of the λ/4 plates with hard coat layers was evaluated by the cross-cut test. More specifically, in an evaluation area of 1 cm×1 cm, the cured cover layer was cut with a single-edged razor blade to form a 1-mm grid pattern, to a depth only slightly beyond the surface of the transparent plastic film, a commercially available 25 mm-wide cellophane tape was placed across the cut area while leaving one end of the tape lifted up, the tape was well adhered by rubbing, and then peeled off vertically as possible, strongly by hand which holds the lifted-up end of the film. Ratio of area causing exfoliation of the cured cover layer, relative to area of the tape which falls on the cut lines, was evaluated according to the criteria below. An area of exfoliation of 15% or more, relative to the evaluation area, indicates a level of adherence less acceptable in practice.

⊚: No exfoliation;

○: area of exfoliation was smaller than 15% of evaluation area;

Δ: area of exfoliation was 15% or larger and smaller than 30% of evaluation area; and x: area of exfoliation was 30% or larger.

<Non-Uniformity of Contrast>

A back light of each liquid crystal display device was kept ON for one hour, followed by the measurement. In the measurement, luminance values of white display and black display on the display screen of the liquid crystal display device were measured in the direction of normal line, using EZ-Contrast 160D from ELDIM, and ratio of the values was defined as on-axis contrast.

On-axis contrast=(luminance of white display measured in direction of normal line of display device)/(luminance of black display measured in direction of normal line of display device)

The on-axis contrast was measured at ten arbitrary points of the liquid crystal display device, and evaluated according to the criteria below.

One possible case of non-uniformity in contrast is ascribable to wrinkle or deformation produced in the hard coat film, and another possible case is ascribable to insufficient curing of the sealing layer.

⊚: No variation and no non-uniformity in on-axis contrast;

○: 1%≤(variation in on-axis contrast)<5%, with small non-uniformity

Δ: 5%≤(variation in on-axis contrast)<10%, with rather non-uniformity; and x: 10%≤(variation in on-axis contrast), with much non-uniformity.

<Evaluation of Crosstalk in 3D Image Observed with Inclined Head>

Crosstalk in 3D image of the thus-manufactured liquid crystal display devices observed with a head being inclined was evaluated.

In an environment of 23° C., 55% RH, immediately after the back light of each of the liquid crystal display device was turned ON, a 3D image was observed through the 3D glasses with the viewer's head being inclined so as to incline the glasses by 25° and crosstalk was evaluated according to the criteria below.

⊚: No crosstalk observed;

○: very weak crosstalk observed;

Δ: weak crosstalk observed; and x: crosstalk strongly observed.

Configurations and results of evaluation of the λ/4 plates with hard coats were summarized in Tables 1 and 2.

TABLE 1

| λ/4 PLATE WITH HARD COAT NO. | SKIN LAYER ON HARD COAT LAYER SIDE ||||  CORE LAYER |||| SKIN LAYER DEGREE OF AC SUBSTITUTION |
|---|---|---|---|---|---|---|---|---|---|
| | DEGREE OF AC SUBSTITUTION | ADHESION MODIFIER ||  THICKNESS [μm] | DEGREE OF AC SUBSTITUTION | ADHESION MODIFIER || THICKNESS [μm] | |
| | | TYPE | CONTENT [% BY MASS] | | | TYPE | CONTENT [% BY MASS] | | |
| 101 | — | — | — | — | 2.75 | A-1 | 0.1 | 80 | — |
| 102 | — | — | — | — | 2.82 | A-1 | 0.1 | 85 | — |
| 103 | — | — | — | — | 2.93 | A-1 | 0.1 | 95 | — |
| 104 | — | — | — | — | CAP | A-1 | 0.1 | 45 | — |
| 105 | — | — | — | — | 2.43 | A-1 | 0.1 | 40 | — |
| 106 | — | — | — | — | 2.75 | A-1 | 0.005 | 80 | — |
| 107 | — | — | — | — | 2.75 | A-1 | 0.05 | 80 | — |
| 108 | — | — | — | — | 2.75 | A-1 | 0.5 | 80 | — |
| 109 | 2.88 | A-1 | 0.005 | 5 | 2.82 | — | — | 80 | 2.88 |
| 110 | 2.88 | A-1 | 0.1 | 5 | 2.82 | — | — | 80 | 2.88 |
| 111 | 2.88 | A-2 | 0.1 | 5 | 2.43 | — | — | 50 | 2.88 |
| 112 | 2.88 | A-2 | 0.5 | 5 | 2.43 | — | — | 50 | 2.88 |
| 113 | 2.88 | A-3 | 0.1 | 5 | 2.82 | — | — | 80 | 2.88 |
| 114 | 2.88 | A-3 | 0.05 | 5 | 2.82 | A-3 | 0.05 | 80 | 2.88 |
| 115 | 2.88 | A-4 | 0.1 | 5 | 2.82 | — | — | 80 | 2.88 |
| 116 | 2.88 | A-5 | 0.1 | 5 | 2.82 | — | — | 80 | 2.88 |
| 117 | 2.88 | A-6 | 0.1 | 5 | 2.82 | — | — | 80 | 2.88 |
| 118 | CAP | A-1 | 0.1 | 2 | 2.82 | — | — | 80 | — |
| 119 | 2.43 | A-1 | 0.1 | 2 | 2.82 | — | — | 80 | — |
| 120 | 2.88 | A-1 | 0.1 | 10 | 2.82 | — | — | 80 | — |
| 121 | 2.88 | A-1 | 0.1 | 5 | CAP | — | — | 45 | — |
| 122 | 2.88 | A-1 | 0.1 | 5 | 2.43 | — | — | 40 | 2.88 |
| 123 | — | — | — | — | COP | A-1 | 0.1 | 87 | — |
| 124 | COP | A-1 | 0.1 | 5 | COP | — | — | 87 | COP |

| λ/4 PLATE WITH HARD COAT NO. | SKIN LAYER THICKNESS [μm] | Ro 590 nm | Rt 590 nm | TRANSMISSIVITY OF LIGHT 380 nm | ADHERENCE OF HARD COAT LAYER | NON-UNIFORMITY OF CONTRAST | CROSSTALK IN 3D DISPLAY | REMARKS |
|---|---|---|---|---|---|---|---|---|
| 101 | — | 137 | 100 | ⊚ | ○ | ⊚ | ⊚ | INVENTION |
| 102 | — | 138 | 100 | ⊚ | ○ | ○ | ○ | INVENTION |
| 103 | — | 135 | 100 | ⊚ | ○ | ○ | ○ | INVENTION |
| 104 | — | 140 | 85 | ⊚ | ○ | ⊚ | ⊚ | INVENTION |
| 105 | — | 141 | 90 | ⊚ | ○ | ⊚ | ⊚ | INVENTION |
| 106 | — | 134 | 100 | ⊚ | ○ | ○ | ○ | INVENTION |
| 107 | — | 138 | 85 | ⊚ | ○ | ⊚ | ⊚ | INVENTION |
| 108 | — | 138 | 100 | ⊚ | ○ | ○ | ○ | INVENTION |
| 109 | 5 | 138 | 100 | ⊚ | ⊚ | ⊚ | ⊚ | INVENTION |
| 110 | 5 | 138 | 100 | ⊚ | ⊚ | ⊚ | ⊚ | INVENTION |
| 111 | 5 | 142 | 80 | ⊚ | ⊚ | ⊚ | ⊚ | INVENTION |
| 112 | 5 | 140 | 85 | ⊚ | ⊚ | ⊚ | ⊚ | INVENTION |
| 113 | 5 | 138 | 100 | ⊚ | ⊚ | ⊚ | ⊚ | INVENTION |
| 114 | 5 | 138 | 100 | ⊚ | ○ | ○ | ○ | INVENTION |
| 115 | 5 | 138 | 100 | ⊚ | ○ | ⊚ | ⊚ | INVENTION |
| 116 | 5 | 138 | 100 | ⊚ | ○ | ⊚ | ⊚ | INVENTION |
| 117 | 5 | 138 | 100 | ⊚ | ○ | ⊚ | ⊚ | INVENTION |
| 118 | — | 139 | 100 | ⊚ | ⊚ | ⊚ | ⊚ | INVENTION |
| 119 | — | 138 | 100 | ⊚ | ○ | ○ | ○ | INVENTION |
| 120 | — | 138 | 100 | ⊚ | ○ | ○ | ○ | INVENTION |
| 121 | — | 140 | 95 | ⊚ | ⊚ | ⊚ | ⊚ | INVENTION |
| 122 | 5 | 138 | 100 | ⊚ | ⊚ | ⊚ | ⊚ | INVENTION |
| 123 | — | 135 | 80 | ⊚ | ○ | ⊚ | ⊚ | INVENTION |
| 124 | 5 | 135 | 85 | ⊚ | ○ | ⊚ | ⊚ | INVENTION |

AC: ACETYL
CAP: CELLULOSE ACETATE PROPIONATE (DEGREE OF ACETYL SUBSTITUTION = 1.90, DEGREE OF PROPIONYL SUBSTITUTION = 0.54)
COP: NORBORNENE RESIN (ZEONOR 1420, FROM ZEON CORPORATION)

TABLE 2

| λ/4 PLATE WITH HARD COAT NO. | SKIN LAYER ON HARD COAT LAYER SIDE | | | | CORE LAYER | | | | SKIN LAYER |
|---|---|---|---|---|---|---|---|---|---|
| | DEGREE OF AC SUBSTITUTION | ADHESION MODIFIER TYPE | ADHESION MODIFIER CONTENT [% BY MASS] | THICKNESS [μm] | DEGREE OF AC SUBSTITUTION | ADHESION MODIFIER TYPE | ADHESION MODIFIER CONTENT [% BY MASS] | THICKNESS [μm] | DEGREE OF AC SUBSTITUTION |
| 125 | — | — | — | — | 2.75 | A-1 | 0.004 | 80 | — |
| 126 | — | — | — | — | 2.75 | A-1 | 0.55 | 80 | — |
| 127 | — | — | — | — | 2.75 | A-1 | 1 | 80 | — |
| 128 | — | — | — | — | 2.75 | A-1 | 2 | 80 | — |
| 129 | — | — | — | — | 2.75 | — | — | 40 | — |
| 130 | — | — | — | — | 2.75 | — | — | 80 | — |
| 131 | — | — | — | — | CAP | — | — | 80 | — |
| 132 | — | — | — | — | 2.43 | — | — | 80 | — |
| 133 | 2.88 | — | — | 2 | 2.82 | — | — | 80 | 2.88 |
| 134 | 2.88 | A-1 | 1 | 5 | 2.82 | — | — | 80 | 2.88 |
| 135 | 2.88 | A-1 | 2 | 5 | 2.82 | — | — | 80 | 2.88 |
| 136 | 2.88 | A-2 | 2 | 5 | 2.43 | — | — | 50 | 2.88 |
| 137 | 2.88 | A-3 | 2 | 5 | 2.43 | — | — | 50 | 2.88 |
| 138 | 2.88 | A-4 | 2 | 5 | 2.43 | — | — | 50 | 2.88 |
| 139 | 2.88 | A-5 | 2 | 5 | 2.43 | — | — | 50 | 2.88 |
| 140 | 2.88 | A-6 | 2 | 5 | 2.43 | — | — | 50 | 2.88 |
| 141 | UNDERLINING LAYER PROVIDED ON HARD COAT LAYER SIDE | | | | 2.75 | — | — | 80 | — |
| 142 | PET FILM | | | 40 | — | — | — | — | — |

| λ/4 PLATE WITH HARD COAT NO. | SKIN LAYER THICKNESS [μm] | Ro 590 nm | Rt 590 nm | TRANSMISSIVITY OF LIGHT 380 nm | ADHERENCE OF HARD COAT LAYER | NON-UNIFORMITY OF CONTRAST | CROSSTALK IN 3D DISPLAY | REMARKS |
|---|---|---|---|---|---|---|---|---|
| 125 | — | 138 | 100 | ○ | Δ | Δ | Δ | COMPARATIVE |
| 126 | — | 138 | 95 | Δ | Δ | Δ | X | COMPARATIVE |
| 127 | — | 138 | 100 | X | X | X | X | COMPARATIVE |
| 128 | — | 138 | 100 | X | X | X | X | COMPARATIVE |
| 129 | — | 20 | 45 | ⊚ | X | X | X | COMPARATIVE |
| 130 | — | 140 | 100 | ⊚ | X | X | X | COMPARATIVE |
| 131 | — | 142 | 100 | ⊚ | X | X | X | COMPARATIVE |
| 132 | — | 141 | 100 | ⊚ | X | X | X | COMPARATIVE |
| 133 | 5 | 138 | 85 | ⊚ | X | X | X | COMPARATIVE |
| 134 | 5 | 138 | 105 | X | X | X | X | COMPARATIVE |
| 135 | 5 | 138 | 100 | X | X | X | X | COMPARATIVE |
| 136 | 5 | 140 | 110 | X | X | X | X | COMPARATIVE |
| 137 | 5 | 141 | 100 | X | X | X | X | COMPARATIVE |
| 138 | 5 | 140 | 95 | X | X | X | X | COMPARATIVE |
| 139 | 5 | 140 | 100 | X | X | X | X | COMPARATIVE |
| 140 | 5 | 139 | 100 | X | X | X | X | COMPARATIVE |
| 141 | — | 135 | 80 | ⊚ | Δ | Δ | Δ | COMPARATIVE |
| 142 | — | 3800 | — | ⊚ | Δ | X | X | COMPARATIVE |

AC: ACETYL
CAP: CELLULOSE ACETATE PROPIONATE (DEGREE OF ACETYL SUBSTITUTION = 1.90, DEGREE OF PROPIONYL SUBSTITUTION = 0.54)
PET: POLYETHYLENE TEREPHTHALATE

It was understood from Tables that the liquid crystal display devices with front plates 101 to 124, having bonded to the front plates thereof the λ/4 plates with hard coats of the present invention, were superior to the liquid crystal display devices with front plates 125 to 142 of Comparative Examples, with respect to adherence between the hard coat layer and the λ/4 plate, uniformity in contrast and suppression of crosstalk in 3D display.

It was also found that particularly excellent characteristics regarding adherence, uniformity in contrast, and suppression of crosstalk in 3D display were shown by the λ/4 plates with hard coats 109 to 122, 124, in which the λ/4 plate was formed by co-casting, the film layer on the hard coat layer side was 0.5 to 10 μm thick, and the film layer on the hard coat layer side contained 90% by mass or more of adhesion modifier relative to the total content in the λ/4 plate.

On the other hand, only small effects of improvement in adherence, uniformity in contrast, and suppression of crosstalk in 3D display were shown by the liquid crystal display device with front plate 141, bonded with the λ/4 plate with hard coat in which the underlining layer was provided between the λ/4 plate and the hard coat layer.

It was also found that the liquid crystal display device 142 using the PET film as the front plate showed only a poor quality of display with moiré pattern and with large crosstalk in the 3D image, which was proved to be inadequate for practical use.

Entire contents of Japanese Patent Application No. 2010-230318, filed on Oct. 13, 2010, including the description, claims, drawings and abstract, are incorporated herein by reference.

INDUSTRIAL APPLICABILITY

As described in the above, the present invention is well adapted to a method for manufacturing a high-contrast and highly-visible liquid crystal display device with front plate and the thus-manufactured liquid crystal display device with front plate.

EXPLANATION OF SYMBOLS 1, 1a polarizing plate
2 liquid crystal cell
3 sealing layer
4 front plate
5 adhesive layer
6 λ/4 plate
7 hard coat layer
10 co-casting die
11 mouthpiece
13, 15 skin layer-forming slit
14 core layer-forming slit
16 metal support
17, 19 skin layer-forming dope
18 core layer-forming dope
20 multi-layered web
21 skin layer
22 core layer
23 skin layer
DR1 feed direction
DR2 wind-up direction
θi feed angle
CR, CL clip
Wo film width before stretching
W film width after stretching

The invention claimed is:

1. A method for manufacturing a liquid crystal display device with a front plate, comprising:
providing, on a surface on a viewing side of a liquid crystal panel having polarizing plates on both sides thereof, a λ/4 plate having a hard coat layer and being composed of mainly a thermoplastic resin, an adhesive layer, a front plate composed of glass or acrylic, and a sealing layer comprising a UV-curable tacky agent, all being stacked in this order from the viewing side; and
curing the sealing layer by irradiating with ultraviolet radiation from a hard coat layer side,
wherein the λ/4 plate having the hard coat layer contains 0.005 to 0.5 parts by mass of a compound which shows an absorption peak (λmax) in a wavelength range of 260 nm to 400 nm per 100 parts by mass of the thermoplastic resin composing the λ/4 plate.

2. The method for manufacturing a liquid crystal display device with a front plate according to claim 1,
wherein the λ/4 plate shows a transmissivity of light at 380 nm of 30% or larger.

3. The method for manufacturing a liquid crystal display device with a front plate according to claim 1,
wherein the compound which shows the absorption peak (mar) in the wavelength range of 260 nm to 400 nm is a benzotriazole-based compound, benzophenone-based compound or triazine-based compound.

4. The method for manufacturing a liquid crystal display device with a front plate according to claim 1,
wherein the λ/4 plate contains 90% by mass or more of the compound which shows the absorption peak (λmax) in the wavelength range of 260 nm to 400 nm, relative to a total content thereof, within a 50% range in a thickness direction of the λ/4 plate from an interface with the hard coat layer.

5. The method for manufacturing a liquid crystal display device with a front plate according to claim 1,
wherein the λ/4 plate is a stack of two or more layers formed by co-casting having a film layer of 0.5 to 10 μm thick on the hard coat layer side, and
wherein the film layer on the hard coat layer side contains 90% by mass or more of the compound which shows the absorption peak (λmax) in the wavelength range of 260 nm to 400 nm relative to the total content thereof in the λ/4 plate.

6. The method for manufacturing a liquid crystal display device with a front plate according to claim 1,
wherein the thermoplastic resin which mainly composes the λ/4 plate is cellulose acylate or alicyclic polyolefin resin.

7. A liquid crystal display device with a front plate manufactured by the method for manufacturing a liquid crystal display device with a front plate according to claim 1.

8. The liquid crystal display device with a front plate according to claim 7, wherein the device is designed for a stereoscopic image display device.

9. A liquid crystal display device with a front plate, comprising:
a λ/4 plate having a hard coat layer and being composed of mainly a thermoplastic resin,
an adhesive layer,
a front plate composed of glass or acrylic, and
a sealing layer comprising a UV-curable tacky agent, all being stacked in this order from a viewing side, on a surface on the viewing side of a liquid crystal panel having polarizing plates on both sides of the liquid crystal panel;
wherein the λ/4 plate having the hard coat layer contains 0.005 to 0.5 parts by mass of a compound which shows an absorption peak (λmax) in a wavelength range of 260 nm to 400 nm per 100 parts by mass of the thermoplastic resin composing the λ/4 plate.

10. The liquid crystal display device according to claim 9, wherein the λ/4 plate shows a transmissivity of light at 380 nm of 30% or larger.

11. The liquid crystal display device according to claim 9, wherein the compound which shows the absorption peak (λmax) in the wavelength range of 260 nm to 400 nm is a benzotriazole-based compound, benzophenone-based compound or triazine-based compound.

12. The liquid crystal display device according to claim 9, wherein the λ/4 plate contains 90% by mass or more of the compound which shows the absorption peak (λmax) in the wavelength range of 260 nm to 400 nm, relative to a total content thereof, within a 50% range in a thickness direction of the λ/4 plate from an interface with the hard coat layer.

13. The liquid crystal display device according to claim 9, wherein the λ/4 plate is a stack of two or more layers formed by co-casting having a film layer of 0.5 to 10 μm thick on the hard coat layer side, and
wherein the film layer on the hard coat layer side contains 90% by mass or more of the compound which shows the absorption peak (λmax) in the wavelength range of 260 nm to 400 nm relative to the total content thereof in the λ/4 plate.

14. The liquid crystal display device according to claim 9, wherein the thermoplastic resin which mainly composes the λ/4 plate is cellulose acrylate or alicyclic polyolefin resin.

* * * * *